(12) United States Patent
Suib et al.

(10) Patent No.: US 11,638,911 B2
(45) Date of Patent: May 2, 2023

(54) MESOPOROUS METAL TITANATES AS MULTIFUNCTIONAL CATALYSTS

(71) Applicant: University of Connecticut, Farmington, CT (US)

(72) Inventors: Steven L. Suib, Storrs, CT (US); Wimalika Rasangi Kumari Thalgaspitiya, Vernon, CT (US); Tharindu M. P. K. Kapuge, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 209 days.

(21) Appl. No.: 16/793,669

(22) Filed: Feb. 18, 2020

(65) Prior Publication Data

US 2020/0261891 A1 Aug. 20, 2020

Related U.S. Application Data

(60) Provisional application No. 62/807,628, filed on Feb. 19, 2019.

(51) Int. Cl.
*B01J 23/755* (2006.01)
*B01J 37/08* (2006.01)
(Continued)

(52) U.S. Cl.
CPC ............ *B01J 23/755* (2013.01); *B01J 23/02* (2013.01); *B01J 23/06* (2013.01); *B01J 23/10* (2013.01); *B01J 23/18* (2013.01); *B01J 23/22* (2013.01); *B01J 23/28* (2013.01); *B01J 23/30* (2013.01); *B01J 23/34* (2013.01); *B01J 23/72* (2013.01); *B01J 23/745* (2013.01); *B01J 23/75* (2013.01); *B01J 35/1019* (2013.01); *B01J 35/1023* (2013.01); *B01J 35/1038* (2013.01);
(Continued)

(58) Field of Classification Search
CPC . B01J 23/755; B01J 23/02; B01J 23/06; B01J 23/10; B01J 23/18; B01J 23/22; B01J 23/28; B01J 23/30; B01J 23/34; B01J 23/72; B01J 23/745; B01J 23/75; B01J 35/1019; B01J 35/1023; B01J 35/1038; B01J 35/1042; B01J 35/1061; B01J 35/1085; B01J 37/0018; B01J 37/04; B01J 37/06; B01J 37/088
See application file for complete search history.

(56) References Cited

U.S. PATENT DOCUMENTS

| 9,452,933 | B2 | 9/2016 | Suib et al. |
| 2007/0149399 | A1* | 6/2007 | Ku ....................... B01J 37/0203 502/439 |
| 2019/0276383 | A1* | 9/2019 | Salam ..................... B01J 23/92 |

OTHER PUBLICATIONS

Absalan et al., Novel synthesis method for photo-catalytic system based on some 3d-metal titanates. J Mater Sci: Mater Electron. 2017, p. 18220. 14 pages.
(Continued)

*Primary Examiner* — James A Fiorito
(74) *Attorney, Agent, or Firm* — Casimir Jones SC; Lisa Mueller

(57) ABSTRACT

The present disclosure relates to mesoporous metal titanate materials composition. Specifically, the present disclosure relates to a mesoporous metal titanate material composition that is active for multiple reactions, including aromatic alkylation, alkene coupling, alkene cyclization, alkyne oxidation, alcohol dehydrogenation reactions.

8 Claims, 10 Drawing Sheets

(51) Int. Cl.

| | |
|---|---|
| *B01J 23/10* | (2006.01) |
| *B01J 23/75* | (2006.01) |
| *B01J 23/72* | (2006.01) |
| *B01J 23/745* | (2006.01) |
| *B01J 23/02* | (2006.01) |
| *B01J 23/34* | (2006.01) |
| *B01J 23/28* | (2006.01) |
| *B01J 23/22* | (2006.01) |
| *B01J 23/30* | (2006.01) |
| *B01J 23/06* | (2006.01) |
| *B01J 35/10* | (2006.01) |
| *B01J 37/04* | (2006.01) |
| *B01J 37/00* | (2006.01) |
| *B01J 37/06* | (2006.01) |
| *B01J 23/18* | (2006.01) |

(52) U.S. Cl.
CPC ....... *B01J 35/1042* (2013.01); *B01J 35/1061* (2013.01); *B01J 35/1085* (2013.01); *B01J 37/0018* (2013.01); *B01J 37/04* (2013.01); *B01J 37/06* (2013.01); *B01J 37/088* (2013.01)

(56) References Cited

OTHER PUBLICATIONS

Adam et al., The nitroso ene reaction: a regioselective and stereoselective allylic nitrogen functionalization of mechanistic delight and synthetic potential. Chem Rev. Oct. 2003;103(10):4131-46.
Ahmadipour et al., A Short Review on Copper Calcium Titanate (CCTO) Electroceramic: Synthesis, Dielectric Properties, Film Deposition, and Sensing Application. Nanomicro Lett. 2016;8(4):291-311.
Albala. Nickel Titanate, the Coolest Yellow https://mitchalbala.com/nickel-titanate-the-coolest-yellow/. Jul. 8, 2010. Downloaded Mar. 29, 2022. 2 pages.
Arbuzov. Reactions of diene hydrocarbons with nitroso-compounds addition of buta-1,3-diene to p-nitrosotoluene. Bulletin of the Academy of Sciences of the USSR Div. Chem. Sci. 1952, 1 (4), 607-611.
Arrivéet al., Exsolution of nickel nanoparticles at the surface of a conducting titanate as potential hydrogen electrode material for solid oxide electrochemical cells. Journal of Power Sources. 2013. vol. 223. pp. 341-348.
Avci et al., Molten Salt Assisted Self Assembly (MASA): Synthesis of Mesoporous Metal Titanate (CoTiO 3, MnTiO 3 , and Li4 Ti 5 O12 ) Thin Films and Monoliths Chem. Mater. 2014, 26 (20), 6050-6057.
Badapanda et al., Dielectric, Ferroelectric and Piezoelectric study of BNT-BT solid solutions around the MPB region. IOP Copnf. Ser. : Mater. Sci. Eng. 2017. 178. 012032. 9 pages.
Bellam et al., Visible-light photocatalytic activity of nitrogen-doped NiTiO3 thin film prepared by co-sputtering process. RSC Adv. 2015, 5 (14), 10551-10559.
Brik et al., Titania-Supported Cobalt and Cobalt—Phosphorus Catalysts: Characterization and Performances in Ethane Oxidative Dehydrogenation. J. Catal. 2001, 202 (1), 118-128.
Cai et al., In situ growth of lamellar ZnTiO3 nanosheets on TiO2 tubular array with enhanced photocatalytic activity. Phys Chem Chem Phys. Dec. 14, 2013;15(46):20203-9.
Cheraghi et al., Corrosion behavior of TiO 2—NiO nanocomposite thin films on AISI 316L stainless steel prepared by sol-gel method. Thin Solid Films; 2012; vol. 522, pp. 289-296.
Chu et al., Preparation and gas-sensing properties of nano-CdIn2O4 material. Mater. Res. Bull. 1999, 34 (5), 693-700.
Della Gaspera et al., Structural evolution and hydrogen sulfide properties of NiTiO3—TiO2 sol-gel thin films containing Au nanoparticles. Mater. Sci. Eng. B Solid-State Mater. Adv. Technol. 2011, 176 (9), 716-722.
Dharmaraj et al., Nickel titanate nanofibers by electrospinning. Mater. Chem. Phys. 2004, 87 (1), 5-9.
Dong et al., Red-Shifting Azobenzene Photoswitches for in Vivo Use. Acc Chem Res. Oct. 20, 2015;48(10):2662-70.
Ehsan et al., Fabrication of CoTiO3-TiO2 composite films from a heterobimetallic single source precursor for electrochemical sensing of dopamine. Dalton Trans. Jun. 21, 2016;45(25):10222-32.
Enhessari et al., Synthesis, characterisation and optical properties of MnTiO3 nanopowders. J. Exp. Nanosci. 2012, 7 (3), 327-335.
Fang et al., High-density NiTiO3/TiO2 nanotubes synthesized sol—gel method using well-ordered TiO2 membranes as template. J. Alloys Compd. 2010, 498 (1), 37-41.
Gao et al., Efficient decomposition of organic compounds with FeTiO3/TiO2 heterojunction under visible light irradiation. Appl. Catal. B Environ. 2008, 83 (3-4), 202-207.
Ghorpade et al., Copper-Mediated [3+2] Annulation of 3-N-Hydroxyallylamines with Nitrosoarenes. Chemistry. Feb. 24, 2016;22(9):2915-9.
Guo et al., Porous ternary TiO2 /MnTiO3 @C hybrid microspheres as anode materials with enhanced electrochemical performances. J. Mater. Chem. A 2015, 3 (47), 23895-23904.
Gupta et al., Mechanical characteristics of flux-grown calcium titanate and nickel titanate crystals. Mater. Chem. Phys. 2005, 89 (1), 64-71.
Hajjaji et al., An overview of using solid wastes for pigment industry. J. Eur. Ceram. Soc. 2012, 32 (4), 753-764.
Hashemaian et al., Effect of copper doping on CoTiO3 ilmenite type nanoparticles for removal of congo red from aqueous solution. Chem. Eng. J. 2014, 235, 299-306.
Hernández-Ramí rez et al., Evaluation of the Nickel Titanate-Modified Pt Nanostructured Catalyst for the ORR in Alkaline Media. J. Electrochem. Soc. 2016, 163 (2), F16-F24.
Hobbs. Properties and Uses of Sodium Titanates and Peroxotitanates. South Carolina Acad. Sci. 2011, 9 (1), 20-24.
Hou et al., A facile route for synthesis of mesoporous barium titanate crystallites. Microporous Mesoporous Mater. 2008, 110 (2-3), 392-396.
Houck et al., Mesoporous Nanocomposites of Mn and Ti Oxides for Supercapacitors. Materials for Energy, Efficiency and Sustainability: TechConnect Briefs. 2018. 75-78.
Huang et al., Bimetal-organic-framework derived CoTiO3 mesoporous micro-prisms anode as superior stable power sodium ion batteries. Sci. China Mater. 2018, 61 (8), 1057-1066.
Inamdar et al., Nickel titanate lithium-ion battery anodes with high reversible capacity and high-rate long-cycle life performance. J. Mater. Chem. A 2016, 4 (13), 4691-4699.
Ji et al., Enantioselective Nitroso Aldol Intramolecular Transesterification Cyclization Domino Reaction for Highly Effective Construction of Chiral Spirooxindoles. European J. Org. Chem. 2016, 2016 (32), 5437-5444.
Kamide et al., Limiting viscosity number—molecular weight relationships for phenol-formaldehyde resin in solution. Die Makromol. Chemie 1978, 372 (3), 359-372.
Kharkwal et al., Comments on "Visible-Light-Induced Photocatalyst Based on Nickel Titanate Nanoparticles". Ind. Eng. Chem. Res 2010, 3 (i), 1995-1996.
Krylova et al., Natural superhydrophilicity and photocatalytic properties of sol-gel derived ZnTiO(3)-ilmenite/r-TiO(2) films. Phys Chem Chem Phys. Dec. 7, 2010;12(45):15101-10.
Kumari et al., Mesoporous BaTiO3@SBA-15 derived via solid state reaction and its excellent adsorption efficiency for the removal of hexavalent chromium from water. Dalton Trans. Jan. 28, 2015;44(4):1924-32.
Lee et al., Effects of Ni in Strontium Titanate Nickelate Thin Films for Flexible Nonvolatile Memory Applications. IEEE Trans. Electron Devices 2017, 64 (5), 2001-2007.
Lew et al., Sulfidation of Zinc Titanate and Zinc Oxide Solids; Ind. Eng. Chem. Res. 1992; vol. 31. 1890-1899.
Lin et al., Synthesis and characterization of ilmenite NiTiO3 and CoTiO3 prepared by a modified Pechini method. J. Non. Cryst. Solids 2006, 352 (8), 789-794.

(56) References Cited

OTHER PUBLICATIONS

Liu et al., Novel iron titanate catalyst for the selective catalytic reduction of NO with NH3 in the medium temperature range. Chem. Commun. 2008, No. 17, 2043-2045.
Lopes et al., NiTiOS powders obtained by polymeric precursor method: Synthesis and characterization. J. Alloys Compd. 2009, 468 (1-2), 327-332.
Lopes et al., Sol-gel synthesis and characterization of Fe2O3 • CeO2 doped with Pr ceramic pigments. J. Sol-Gel Sci. Technol. 2008, 45 (2), 151-155.
Luo et al., Low-temperature synthesis and characterization of (Zn,Ni)TiO3 ceramics by a modified sol—gel route. J. Alloys Compd. 2006, 420 (1-2), 317-321.
Miro et al., Oxidative Coupling of Methane on Alkali Metal-Promoted Nickel Titanate. J. Catal. 1990, 124 (2), 451-464.
Moghiminia et al., Comparative optical and electrochemical studies of nanostructured NiTiO3 and NiTiO3-TiO2 prepared by a low temperature modified Sol-Gel route. Electrochim. Acta 2014, 132, 512-523.
Mohammadi et al., Sol-gel derived nanocrystalline and mesoporous barium strontium titanate prepared at room temperature. Particuology 2011, 9(3), 235-242.
Mohammadi et al.,Mesoporous and nanocrystalline sol—gel derived NiTiO3 at the low temperature: Controlling the structure, size and surface area by Ni:Ti molar ratio. Solid State Sci. 2010, 12 (9), 1629-1640.
Møller et al., Chemistry of molybdenaoxaziridines. A study of oxo(N-phenylhydroxylamido-O,N)-(pyridine-2,6-dicarboxylato) (hexamethylphosphortriamide)molybdenum(VI) and its catalytic properties. J. Am. Chem. Soc. 1993, 115 (25), 11814-11822.
Momiyama et al., Enantioselective O- and N-nitroso aldol synthesis of tin enolates. Isolation of three BINAP-silver complexes and their role in regio- and enantioselectivity. J Am Chem Soc. May 5, 2004;126(17):5360-1.
Murugan et al., Phase evolution of NiTiO3 prepared by coprecipitation method. Mater. Lett. 2006, 60 (15), 1791-1792.
Nakhowong. Fabrication and characterization of MnTiO3 nanofibers by sol—gel assisted electrospinning. Mater. Lett. 2015, 161, 468-470.
Ni et al., Nickel titanate microtubes constructed by nearly spherical nanoparticles: Preparation, characterization and properties. Mater. Res. Bull. 2009, 44 (8), 1797-1801.
Phani et al., Structural characterization of nickel titanium oxide synthesized by sol-gel spin coating technique. Thin Solid Films 2001, 396 (1-2), 1-4.
Pishch et al., Production of Pigments with a Perovskite-Like Structure Based on Nickel Titanate by the Precipitation Method. Glass and Ceramics. 2003, 60, 154-157.
Poyraz et al., A general approach to crystalline and monomodal pore size mesoporous materials. Nat Commun. 2013;4:2952. 10 pages.
Priewisch et al., Efficient preparation of nitrosoarenes for the synthesis of azobenzenes. J Org Chem. Mar. 18, 2005;70(6):2350-2.
Qu et al., Facile preparation of porous NiTiO 3 nanorods with enhanced visible-light-driven photocatalytic performance. J. Mater. Chem. 2012, 22 (32), 16471-16476.
Rudrangi et al., Oxindoles and Their Pharmaceutical Significance-an Overview. Asian J. Res. Chem. 2011, 4, 335-338.
Sadjadi et al., Effects of NiTiO3 nanoparticles supported by mesoporous MCM-41 on photoreduction of methylene blue under UV and visible light irradiation. Superlattices Microstruct. 2010, 47 (6), 685-694.
Sadjadi et al., Structural characterization of NiTiO3 nanopowders prepared by stearic acid gel method. Mater. Lett. 2008, 62 (21-22), 3679-3681.
Sakaue et al., Oxidation of aromatic amines with hydrogen peroxide catalyzed by cetylpyridinium heteropolyoxometalates. J. Org. Chem. 1993, 58 (14), 3633-3638.
Selvarajan et al., Fabrication of mesoporous BaTiO3/SnO2 nanorods with highly enhanced photocatalytic degradation of organic pollutants. J. Ind. Eng. Chem. 2017, 53, 201-212.
Sharma et al., Synthesis and characterization of titanates of the formula MTiO3 (M = Mn, Fe, Co, Ni and Cd) by co-precipitation of mixed metal oxalates. Polyhedron 2009, 28 (3), 579-585.
Shilpy et al., Performance of cobalt titanate towards H2O2 based catalytic oxidation of lignin model compound. RSC Adv. 2015, 5 (97), 79644-79653.
Shiraishi et al., Selective Photocatalytic Oxidation of Aniline to Nitrosobenzene by Pt Nanoparticles Supported on TiO2 under Visible Light Irradiation. ACS Catal. 2014, 4 (8), 2418-2425.
Shukla et al., Synthesis of Nanostructured Cobalt Titanate and its Application as Liquefied Petroleum Gas Sensor at Room Temperature. Sens. Lett. 2011, 9 (2), 533-540(8).
Siemons et al., Gas sensing properties of vol. doped CoTiO3 synthesized via polyol method. Sensors Actuators, B Chem. 2007, 126 (2), 595-603.
Somiya. Handbook of Advanced Ceramics: Materials, Applications, Processing, and Properties: Second Edition; Elsevier, 2013. TOC only. 5 pages.
Song et al., Synthesis of hierarchically macro-mesoporous CoTiO3 with improved gas sensing properties. Mater. Res. Express 2018, 5 (6). 24 pages.
Song et al., Synthesis of manganese titanate MnTiO3 powders by a sol—gel—hydrothermal method. Mater. Sci. Eng. B Solid-State Mater. Adv. Technol. 2004, 113 (2), 121-124.
Stanca et al., Photocatalyst activation by intrinsic stimulation in TiO2—BaTiO3. Catal. Sci. Technol. 2012, 2 (7), 1472-1479.
Steiner et al., Ternary titanates as anode materials for solid oxide fuel cells. J. Alloys Compd. 1993, 190 (2), 279-285.
Taylor et al., Sol—gel derived, nanostructured oxide lubricant coatings. Surface and Coatings Technology; 1999; vol. 120-121, pp. 465-469.
Taylor et al., Characterization of nickel titanate synthesized by sol—gel processing. Thin Solid Films 2002, 408 (1-2), 104-110.
Traistaru et al., Synthesis and Characterization of NiTiO 3 and NiFe 2 O 4 as catalysts for toluene oxidation. Dig. J. Nanomater. Biostructures 2011, 6 (3), 1257-1263.
Tsuda et al., Electrode performance of layered LiNi0.5Ti0.5O2 prepared by ion exchange. J. Power Sources 2005, 144 (1), 183-190.
Vijayalakshmi et al., Effect of Reaction Temperature on Size and Optical Properties of NiTiO3 Nanoparticles. E-Journal Chem. 2012, 9 (1), 282-288.
Wang et al., MnTiO3-driven low-temperature oxidative coupling of methane over TiO2-doped Mn2O3-Na2WO4/SiO2 catalyst. Sci. Adv. 2017, 3 (6), e1603180. 10 pages.
Wang et al., Synthesis and characterization of NiTiO3 yellow nano pigment with high solar radiation reflection efficiency. Powder Technol. 2013, 235, 303-306.
Xin et al., Visible-Light-Induced Photocatalyst Based on Nickel Titanate Nanoparticles. Ind. Eng. Chem. Res. 2008, 47 (14), 4750-4753.
Yamamoto et al., Perovskite-type oxides as oxygen electrodes for high temperature oxide fuel cells. Solid State Ionics 1987, 22 (2-3), 241-246.
Yuan et al., Preparation and photocatalytic properties of ilmenite NiTiO3 powders for degradation of humic acid in water. Int. J. Miner. Metall. Mater. 2012, 19 (4), 372-376.
Yuvaraj et al., Investigations on the temperature dependent electrical and magnetic properties of NiTiO 3 by molten salt synthesis. Mater. Res. Bull. 2013, 48 (3), 1110-1116.
Zarazúa-Morín et al., Synthesis, characterization, and catalytic activity of FeTiO3 /TiO 2 for photodegradation of organic pollutants with visible light. Res. Chem. Intermed. 2016, 42 (2), 1029-1043.
Zhang et al., Synthesis of cadmium titanate powders by a sol-gel-hydrothermal method. J. Mater. Sci. 2003, 38 (11), 2353-2356.
Zhou et al., Synthesis and structural properties of manganese titanate MnTiO 3 nanoparticle. Mater. Sci. Eng. C 2004, 24 (1-2), 71-74.

\* cited by examiner

MESOPOROUS METAL TITANATES AS MULTIFUNCTIONAL CATALYSTS

CROSS-REFERENCE TO RELATED APPLICATIONS

This application claims the benefit of U.S. Provisional Patent Application No. 62/807,628 filed on Feb. 19, 2019. The entire contents of this provisional application are incorporated herein by reference in their entirety.

GOVERNMENT SUPPORT

This invention was made with government support under grant number 52266400 awarded by the Department of Energy. The government has certain rights in the invention.

BACKGROUND OF THE INVENTION

1. Field of the Discovery

The present disclosure relates to mesoporous metal titanate catalysts. Specifically, the present disclosure relates to metal titanate catalysts having a mesoporous structure with finely tuned pore sizes and surface areas that are active for multiple reactions, including aromatic alkylation, alkene coupling, alkene cyclization, alkyne oxidation, alcohol dehydrogenation reactions

2. Background Information

The ilmenite-structured metal titanates with the formula $MTiO_3$ (M=transition metal) are known to be an important class of inorganic materials due to their wide variety of applications. Transitions metal titanates exhibit excellent optical and electrical properties.[1] Thus, transition metal titanates can be used as semiconductor, gas sensing,[2,3,4] electrochemical sensing,[5] catalytic,[6,7,8,9] photocatalytic,[10,11,12,13,14,15,16] $Li^+$ ion battery,[17] tribological coating,[18] corrosion inhibitor,[19] pigment,[20,21,22] and electrochemical energy storage[23,24,25] materials. However, the properties of these materials vary with the synthesis methods and reactions conditions. Among many other synthesis methods, the solid state sintering,[26] Pechini process,[13,27] wet chemical method,[21,28] coprecipitation,[14,20,29,30] solution combustion,[31,32] electrospinning[33], flux growth,[34] pyrolysis of polymeric precursor method,[35,36] hydrothermal treatment,[37] and sol-gel method,[18,38,39,40,41,42,43,44] have gained much attention during past few decades.

Cobalt titanate is well studied for gas sensing and catalytic applications. In 2001, Y. Brik et al. used $CoTiO_3$ in the ethane oxidative dehydogenation[45] and M. Shilpy et al. have studied the catalytic oxidation of vanillyl alcohol to vanillin.[6] X. Chu et al. reported the ethanol sensing property of Nano-$CoTiO_3$ in 1999[46] and M. Siemons et al. reported detection of ethanol and propylene down to the low ppm range using volume-doped $CoTiO_3$ synthesized via polyol method.[3] the sensor property for liquified petroleum gas was reported by T. Shukla et al.[2] while electrochemical sensing of dopamine using $CoTiO_3$ was reported by M. A. Ehsan et al.[5]

The other most widely studied material is nickel titanate ($NiTiO_3$) owing to its excellent photocatalytic activity. P. Yuan el. al reported the photocatalytic degradation of humic acid in water using $NiTiO_3$ synthesized via Pechini method.[13] J. Bellam et. al reported the possibility to shift the photocatalytic activity to the visible range upon doping with nitrogen.[47] The hydrogen sulfide sensing property of $NiTiO_3$ thin films prepared by sol-gel method was reported by E. Gaspera et. al.[4] Moreover, M. Sadjadi et. al reported the photoreduction of methylene blue under UV and visible light.[42] J. Santamaria et. al studied the catalytic oxidative coupling of methane using $Na/NiTiO_3$.[7] According to V. Pishch et. al $NiTiO_3$ prepared by precipitation method can be used as pigments which can be used to tint glaze coatings of ceramic tiles.[20] Furthermore, J Wang et. al has reported $NiTiO_3$ yellow nano pigment has high solar radiation reflection efficiency.[21] The synthesis of $NiTiO_3$ using auto combustion method for toluene oxidation was reported by G. Traistaru in 2011[8] and D. Taylor et. at has studied sol-gel derived, nano structured nickel titanate as lubricant coatings.[18]

$CdTiO_3$ has been synthesized via sol-gel hydrothermal method by X. Zhang et al.[37] and S. Guo et al. have reported the synthesis of $MnTiO_3$ hybrid microspheres with enhanced electrochemical performances.[17] Furthermore, photocatalytic properties of $ZnTiO_3$ towards the photo mineralization of fatty acids has been studied by G. Krylova et al.[10] The catalytic activity of bacteria lysis by $BaTiO_3$ was reported by S. Stanca et al. in 2012.[12] Owing to the strong absorption in the visible range[48] $MnTiO_3$ is widely used to utilize solar energy and photocatalysis.[49] In addition, B. Gao et al. reported the decomposition of organic compounds under visible light using $FeTiO_3$[50] and according to F. Liu et al. $FeTiO_3$ shows excellent catalytic activity in reduction of NO in the presence of $NH_3$.[51] Furthermore, due to their excellent dielectric, piezoelectric, pyroelectric and photo strictive properties, $BaTiO_3$, $CdTiO_3$, $Bi_{12}TiO_{20}$, $CoTiO_3$ and $PbTiO_3$ are named as 'smart' family among other metal titanates.[52] M. Tsuda et al. have reported a ternary metal oxide electrode material consisting of $LiNi_{0.5}Ti_{0.5}O_2$ synthesized via ion exchange process.[24] Another research group, J. Steiner et al. have studied on ternary metal titanates as an anode material to be used in solid oxide fuel cells.[53]

There are only few reports on mesoporous metal titanates where C. Avci et al. have used molten salt assisted self-assembly for the synthesis of mesoporous metal titanate thin films[54] and S. Guo et al. have performed research on porous $MnTiO_3$.[17] Most of the reported work involves in the preparation of thin films. Furthermore, the reported studies show comparatively lower surface areas (see Table 1).

TABLE 1

Literature reported surface areas and details on mesoporosity

| Material | Literature Surface area ($m^2/g$) | Mesoporous | Monomodal | Reference |
|---|---|---|---|---|
| $NiTiO_3$ | 147.0 | Yes | Yes | 55 |
|  | 4 | No | No | 56 |
|  | 2 | No | No | 57 |
|  | 156 | Yes | Not given | 40 |
|  | 85.9 | Yes | No | 58 |
| $CoTiO_3$ | 128.3 | Yes | Yes | 55 |
|  | 12.5 | No | No | 59 |
|  | 47 | Meso-macro both | No | 60 |
|  | 15.6 | No | No | 61 |
| $MnTiO_3$ | 114.3 | Yes | Yes | 55 |
|  | 1.2-1.4 | Yes | Not given | 62 |
|  | 30.6 | Yes | Not given | 63 |
| $BaSrTiO_3$ | 49 | yes | Not given | 64 |
| $FeTiO_3$ | 10 | No | No | 65 |
| $BaTiO_3$ | 50 | Yes | No | 66 |
|  | 38 | Yes | Not given | 67 |
|  | 185 | Yes | Yes | 68 |

There is a need in the art to develop inorganic catalysts with higher catalytic efficiency. In particular, as pore sizes and surface areas which play the main role in most of the applications, there is a need for catalysts having finely tuned properties to produce highly efficient catalysts.

BRIEF SUMMARY OF THE INVENTION

In one aspect, the invention provides mesoporous metal titanate materials. Specifically, the invention provides metal titanate materials having a mesoporous structure with finely tuned pore sizes and surface areas that are active as catalysts for multiple reactions, including aromatic alkylation, alkene coupling, alkene cyclization, alkyne oxidation, alcohol dehydrogenation reactions.

In certain embodiments, the mesoporous metal titanate material has, without being limited thereto, an average pore diameter from about 2 to about 7 nm; from about 2 to about 5 nm; or from about 2.8 to about 3.8 nm.

In certain other embodiments, the mesoporous metal titanate material has, without being limited thereto, a surface area of about 200 $m^2/g$ to about 550 $m^2/g$; of about 210 $m^2/g$ to about 425 $m^2/g$; or of about 225 $m^2/g$ to about 400 $m^2/g$.

In still other embodiments, the mesoporous metal titanate material is in the form of one or more particles. In such embodiments, without being limited thereto, the one or more particles have an average particle diameter of less than 50 nm; or of about 1 nm to about 40 nm. In other embodiments, the mesoporous metal titanate material is in the form of a monolith.

In certain embodiments, the mesoporous metal titanate material of the invention has a monomodal pore size distribution. In particular embodiments, the material has a homogenous pore size distribution throughout the material.

In still other embodiments of the mesoporous metal titanate material of the invention, the metal is a transition metal, a p-block metal, an s-block metal, or a lanthanide. In particular embodiments, the metal is a transition metal, including, but not limited to, a first row-transition metal (for example, V, Mn, Fe, Co, Ni, Cu, Zn), Mo or W. In other embodiments, the metal is a p-block metal, including but not limited to, Bi or Sn. In still other embodiments, the metal is an s-block metal, including but not limited to, Ca, Ba, Sr, or Mg. In yet other embodiments, the metal is a lanthanide, including but not limited to, Ce.

In another aspect, the invention provides a multifunctional catalyst comprising the mesoporous metal titanate material according to the invention. In certain embodiments the multifunctional catalyst comprises one or more mesoporous metal titanate material according to the invention In still another aspect, the invention provides a method for preparing a mesoporous metal titanate, said process comprising:
  dissolving a titanium source and a metal in $H_2O_2$ followed by a solvent to form a dissolved titanium metal precursor,
  adding a soft template material to the dissolved titanium metal precursor in the presence of a solvent and nitric acid to form a reaction mixture;
  removing the solvent from the reaction mixture to form a foamed metal titanate material; and calcining the foamed metal titanate material to form a mesoporous metal titanate.

In other embodiments of the method of the invention, the method further comprises a washing step wherein the foamed metal titanate material is washed with ethanol and dried.

In particular embodiments of the method of the invention, the titanium source is titanium (IV) butoxide.

In other embodiments of the method of the invention, the soft template material is a surfactant. In particular embodiments, the soft template material is an EO/PO block copolymer surfactant. In more particular embodiments, the EO/PO block copolymer surfactant is, without limitation, Pluronic® P65 (HO($CH_2CH_2O)_{20}(CH_2CH(CH_3)O)_{30}$ $(CH_2CH_2O)_{20}$H) or (EO20PO30EO20), Pluronic® P85 (HO $(CH_2CH_2O)_{26}(CH_2CH(CH_3)O)_{40}(CH_2CH_2O)_{26}$H) or (EO26PO40EO26), Pluronic® 25R4 (PO19EO33PO19), Pluronic® F108 (HO($CH_2CH_2O)_{129}(CH_2CH(CH_3)O)_{56}$ $(CH_2CH_2O)_{129}$H) or (EO129PO56EO129), Pluronic® P123 (HO($CH_2CH_2O)_{20}(CH_2CH(CH_3)O)_{70}(CH_2CH_2O)_{20}$H) or (EO20PO70EO20) and Pluronic® F127 (HO($CH_2CH_2O)_{97}$ $(CH_2CH(CH_3)O)_{69}(CH_2CH_2O)_{97}$H) or (EO97PO69EO97). In particular embodiments, the EO/PO block copolymer surfactant is Pluronic® P123.

In another embodiment of the method of the invention, the reaction mixture comprises 0.01 mol of metal, 0.01 mol of titanium (IV)butoxide, 0.23 mol of solvent, 0.034 mol of nitric acid, and $4.3 \times 10^{-4}$ mol of Pluronic 123.

In particular embodiments of the method of the invention, the calcining step is performed at 150-700° C. at about 5° C./min ramp rate under air. In still other embodiments of the method of the invention, the calcining step is performed from 1-12 hours.

In still another aspect, the invention provides A mesoporous metal titanate material wherein the mesoporous metal titanate is:
  a) a bismuth titanate having a BET surface area of 214 $m^2/g$, a BJH pore volume of 0.70 cc/g and an average pore diameter of 2.0 nm;
  b) a cerium titanate having a BET surface area of 365 $m^2/g$, a BJH pore volume of 0.30 cc/g and an average pore diameter of 3.8 nm;
  c) a cobalt titanate having a BET surface area of 404 $m^2/g$, a BJH pore volume of 0.30 cc/g and an average pore diameter of 3.8 nm;
  d) a copper titanate having a BET surface area of 229 $m^2/g$, a BJH pore volume of 0.20 cc/g and an average pore diameter of 2.0 nm;
  e) an iron titanate having a BET surface area of 353 $m^2/g$, a BJH pore volume of 0.15 cc/g and an average pore diameter of 3.4 nm;
  f) a magnesium titanate having a BET surface area of 416 $m^2/g$, a BJH pore volume of 0.76 cc/g and an average pore diameter of 3.8 nm;
  g) a manganese titanate having a BET surface area of 511 $m^2/g$, a BJH pore volume of 0.10 cc/g and an average pore diameter of 2.8 nm;
  h) a molybdenum titanate having a BET surface area of 245 $m^2/g$, a BJH pore volume of 0.18 cc/g and an average pore diameter of 3.4 nm;
  i) a nickel titanate having a BET surface area of 423 $m^2/g$, a BJH pore volume of 0.26 cc/g and an average pore diameter of 3.8 nm;
  j) a vanadium titanate having a BET surface area of 252 $m^2/g$, a BJH pore volume of 0.32 cc/g and an average pore diameter of 4.9 nm;
  k) a tungsten titanate having a BET surface area of 295 $m^2/g$, a BJH pore volume of 0.28 cc/g and an average pore diameter of 3.4 nm; or
  l) a zinc titanate having a BET surface area of 282 $m^2/g$, a BJH pore volume of 0.22 cc/g and an average pore diameter of 3.8 nm.

Further objects, aspects, embodiments, features and advantages of the present disclosure will be understood by reference to the following drawings and detailed description

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION OF THE INVENTION

Figure 1:
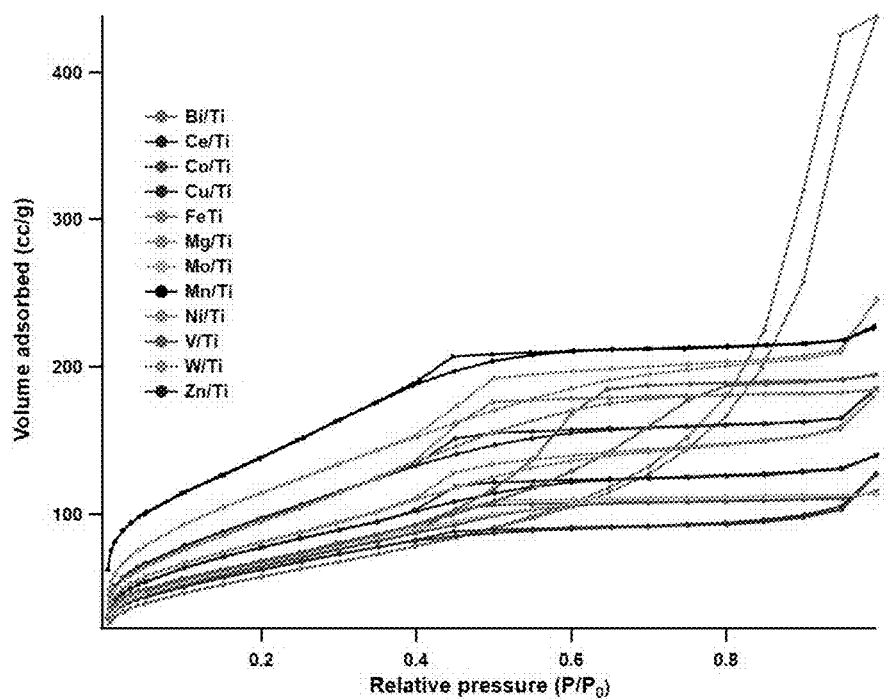
FIG. 1 illustrates the nitrogen sorption isotherms of exemplary metal titanates of the invention.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

All numerical values within the detailed description and the claims herein are modified by "about" or "approximately" the indicated value, and take into account experimental error and variations that would be expected by a person having ordinary skill in the art.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Metal Titanates

In one aspect the invention provides a mesoporous metal titanate material. In particular, the metal titanates of the invention provide for finely tuned monomodal, mesoporous materials suitable for a variety of applications.

The pore size (diameter), e.g., BJH desorption, may be between about 1 and 50 nm, or between about 1.5 and 50 nm, 1.5 and 20 nm, 2 and 15 nm, and 2 and 13 nm, and may be about 2.0, 2.5, 3.0, 3.5, 4.0, 4.5, 0.5.0, 5.5 and 6 nm.

In certain embodiments, the mesoporous metal titanate material has an average pore diameter of about 2 to about 7 nm. In a further embodiment, the mesoporous metal titanate material has an average pore diameter of about 2.0 to about 5.0 nm. In another embodiment, the mesoporous metal titanate material has an average pore diameter of about 2.8 to about 3.8 nm.

The surface area of the mesoporous metal titanate materials, e.g. BET surface area, may be between about 50 and about 1000 $m^2/g$, and may be between about 60 and 500, 70 and 200 and 80 and 190, $m^2/g$, and may be about 50, 75, 100, 125, 150, 175 or 200 $m^2/g$.

In another embodiment, the mesoporous metal titanate material has surface area of about 200 $m^2/g$ to about 550 $m^2/g$. In certain instances, the mesoporous metal titanate material has a surface area of about 210 $m^2/g$ to about 425 $m^2/g$. In other instances, the mesoporous metal titanate material has a surface area of about 225 $m^2/g$ to about 400 $m^2/g$.

In certain embodiment, the mesoporous metal titanate material of the invention is in the form of a particle. In certain embodiments, the mesoporous metal titanate material of the invention is in the form of a monolith. In certain embodiment, the mesoporous metal titanate material of the invention is in the form of an aggregate of particles. The mesoporous materials may have a 3-D cubic or 3-D foam-like mesostructure, or may have a 2-D hexagonal or worm-like mesostructure.

In another embodiment, when the material is in the form of a particle, the mesoporous metal titanate material has an average particle diameter of less than 50 nm. In a further embodiment, the material has an average particle diameter of about 1 nm to about 40 nm.

The pore volume (BJH) may be between about 0.05 and about 2 $cm^3/g$, or between about 0.075 and 2, and 0.1 and 2 $cm^3/g$, and may be about 0.05, 0.1, 0.15, 0.2 or 0.25 $cm^3/g$.

The wall thickness ($2d/\sqrt{3}-PD$, where d is the d-spacing and PD is the pore diameter) may be between about 2 and about 20 nm, or between about 3 and about 16 nm, 4 and 14 nm, or 5 and 12 nm, and may be about 5.0 5.5, 6.0, 6.5, 7.0, 7.5, 8.0, 8.5, 9.0, 9.5 and 10.0 nm. The formula applies to 2-dimensional hexagonal materials.

The mesoporous particulates may be round or spherical, or may be oblate spherical, rod-like, aggregated, ellipsoid, ovoid, a modified oval shape, dome shaped, hemispherical; a round ended cylinder, capsule shaped, discoid, prismatic, acicular or polyhedral (either regular or irregular) such as a cube, a rectangular prism, a rectangular parallelepiped, a triangular prism, a hexagonal prism, rhomboid or a polyhedron with between 4 and 60 or more faces, or may be some other shape, for example an irregular shape.

The mesoporous metal titanate material advantageously demonstrate a monomodal pore size distribution. In further embodiment, the materials have a homogenous pore size distribution throughout the material.

In addition to titanium, the mesoporous metal titanate materials of the invention comprise one or more additional metals forming a mixed metal oxide. In certain embodiments, the additional metal is a transition metal, a p-block metal, an s-block metal, or a lanthanide.

Transition metals used in the mesoporous metal titanate materials of the invention include but are not limited to: first row-transition metals (including but not limited to V, Mn, Fe, Co, Ni, Cu, and Zn). In certain embodiments, the transition metals used in the mesoporous metal titanate materials of the invention may be second, third, or fourth row transition metals, including, but not limited to Mo or W.

P-block metals used in the mesoporous metal titanate materials of the invention include but are not limited to: Bi or Sn.

S-block metals used in the mesoporous metal titanate materials of the invention include but are not limited to: Ca, Ba, Sr, or Mg.

Lanthanides used in the mesoporous metal titanate materials of the invention include but are not limited to: Ce.

In certain embodiments, the mesoporous metal titanates of the invention include oxides of transition metals, Lanthanide metals, post-transition metals, metalloids, and mixtures thereof. For example, the transition metal titanates comprise Group 3-12 transition metal titanates, in particular, Sc, Y, La, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg titanates. In an embodiment, the transition metal titanates are selected from Group 6-12 transition metal titanates including Cr, Mo, W, Mn, Tc, Re, Fe, Ru, Os, Co, Rh, Ir, Ni, Pd, Pt, Cu, Ag, Au, Zn, Cd and Hg titanates. Preferably, the Group 6-12 transition metal titanates include Mn, Fe, Co, Ni, Cu and Zn titanates. The Lanthanide metal titanates include La, Ce, Pr, Nd, Pm, Sm, Eu, Gd, Tb, Dy, Ho, Er, Tm, Yb and Lu titanates, or any mixture thereof. The post-transition metal titanates include Al, Ga, In, Tl, Sn, Pb and Bi titanates, or any mixture thereof.

Synthesis

In another aspect, the invention provides a novel, generalized synthesis method for a series of mesoporous transition metal titanate powders (first row transition metals and few post transition metals) with high surface area (200-500 m$^2$/g). This is the first report which involves inverse micelle formation with a soft template Pluronic 123 (Poly (ethylene glycol)-block-poly (propylene glycol)-block-poly (ethylene glycol)) for the synthesis of mesoporous metal titanates.

In comparison to the titanates synthesized via conventional methods, as synthesized materials can be used as tandem catalysts and in a wide variety of applications due to the porous nature and high surface areas.

The advantage of the introduced method is the ability to tune the pore sizes and surface areas which play the main role in most of the applications. For gas sensing the pore size of the material is important and having a method to tune the pore size would increase its ability to be used in different sensing applications. In most catalytic systems the surface area plays a major role as it can control the number of active sites. Hence, the novel metal titanates with high surface area could be used as highly efficient catalysts. The optical and electronic properties of the thin films and bulk materials are different from each other. As synthesized powders can be used as both bulk materials or thin films which expands its scope.

In one aspect, the invention provides a method for preparing a mesoporous metal titanate, said process comprising:
  a) dissolving a titanium source and a metal in H$_2$O$_2$ followed by a solvent to form a dissolved titanium metal precursor,
  b) adding a soft template material to the dissolved titanium metal precursor in the presence of a solvent and nitric acid to form a reaction mixture;
  c) removing the solvent from the reaction mixture to form a foamed metal titanate material; and
  d) calcining the foamed metal titanate material to form a mesoporous metal titanate.

In certain embodiments, the method for preparing a mesoporous metal titanate can utilize a metal precursor in place of the metal. In such embodiments, the dissolution step may be undertaken without dissolving the metal precursor in H$_2$O$_2$.

The process of this disclosure involves a sol-gel micelle based method. The inverted micelle controlled formation of the mesoporous metal titanate materials of this disclosure makes the tuning of physicochemical properties of the materials possible by controlling micellization and intermicellar interaction using additives, i.e., co-surfactants, organic and inorganic additives, mixed metal oxides, solvents and solvent mixtures, and acid mixtures. This disclosure demonstrates fine tuning of these parameters by the use of co-surfactants, organic and inorganic additives, mixed metal oxides, solvents and solvent mixtures, and acid mixtures, in the synthesis of the mesoporous metal titanate materials. In addition to the synthetic procedures described herein, synthetic procedures such as those found in U.S. Pat. No. 9,452,933, which is incorporated herein by reference in its entirety, can be adapted for the formation of mesoporous metal titanates. In particular, the procedures found in U.S. Pat. No. 9,452,933 can be used when a metal precursor is used in place of the metal.

In the process of this disclosure, the micellar solution may comprise water, and may be an aqueous solution. This may also be a solution, a dispersion or an emulsion, and may be a microemulsion. This solution may have a pH between about 0.5 and about 5, or between about 1 and about 3. The surfactant may be anionic, cationic, non-ionic, zwitterionic, or mixtures thereof. This may be a polymeric surfactant, and may be a copolymer surfactant, for example a block copolymer surfactant. The surfactant may be an alkylene oxide block copolymer surfactant, e.g. an EO/PO block copolymer surfactant. The surfactant may be miscible or immiscible with the interface modifier.

The process of this disclosure can be conducted at a pressure sufficient to form the mesoporous metal titanate materials. Positive or negative pressures may be useful in the process of this disclosure. Suitable combinations of pressure, temperature and contact time may be employed in the process of this disclosure, in particular, temperature-pressure relationships that give mesoporous metal titanate materials having desired properties and/or characteristics. The pressure may range between about ambient and about 50 atmospheres, preferably between about ambient to about 40 atmospheres, and more preferably between about ambient to about 25 atmospheres. Normally the process is carried out at ambient pressure.

The process may additionally comprise washing the dried powder, e.g., nanoparticulates, for a period of time sufficient to remove organic components therefrom. The washing liquid may be water, or an aqueous liquid, or with a non-aqueous liquid, or an organic liquid (e.g., ethanol), or some combination of these. The particles may be washed once or more than once, and may be washed between 1 and about 10 times or more. Each wash may be with the same washing liquid as any other wash, or may be with a different washing liquid. The washing may comprise exposing the nanoparticulates to the washing liquid, e.g. suspending the nanoparticulates in the washing liquid, and then separating the nanoparticulates from the washing liquid, using any of the separating processes described herein. In particular, the dried powder is washed with ethanol for a period of time sufficient to remove surfactant therefrom.

The process may additionally comprise at least partially separating the nanoparticulates from a fluid (e.g., washing fluid) in which they are located (optionally suspended or dispersed). This may comprise filtering, settling, decanting, centrifuging, vacuum filtering, dialysis, membrane filtering, magnetic separation, or some other suitable process, and may comprise more than one of these.

The titanium source is not particularly limited provided that it is capable of being dissolved in the solvent. In certain embodiments, the titanium source is a hydrolysable titanium-containing compound. Such titanium sources include alkyl titanates and titanium alkoxides. In a specific embodiment, the titanium source is titanium (IV) butoxide.

The metal source is not particularly limited. In general, the use of substantially pure metal will be the primary metal source. As used herein "pure metal" refers to a film that comprises substantially only one metal. The term "substantially only one metal" means that there is greater than about 95% of the subject metal on an atomic basis.

In other embodiments, metal precursors can be used as the metal source. The metal precursors useful in the processes of this disclosure can be any water soluble metal salt. For example, metal salts with hydrotropic counter anions and alkoxide sources of any metal. Metal precursors also exhibit moderate alcohol solubility. Metal precursors are conventional materials known in the art and are commercially available.

One or more metal precursors are useful in the processes of this disclosure. Physicochemical properties of the mesoporous metal titanate materials of this disclosure can be controlled by the use of mixed metal titanates in the synthesis thereof.

Illustrative metal precursors include, for example, metal nitrates, metal alkoxides, metal halides, metal phosphates, metal acetates, and $M_xO_y$ oxides that are capable of dissolving in $HNO_3$. More particularly, metal precursors include, for example, $M(NO_3)_x \cdot yH_2O$ (M=Mn, Fe, Co, Cu, Zn, Si), tetraethyl orthosilicate (TEOS), tetramethyl orthosilicate (TMOS), titanium butoxide, zirconium n-propoxide, zirconium butoxide, $Ce(NO_3)_3 \cdot 6H_2O$, $Gd(NO_3)_3 \cdot 6H_2O$, $Sm(NO_3)_3 \cdot 6H_2O$, and the like.

Other metal precursors useful in the process of this disclosure include, for example, metal $Cl^-$, $I^-$, $SCN^-$, $SO_4^{2-}$, $F^-$ salts, and the like. Preferably, any metal and metal oxide which $HNO_3$ can dissolve can be used. Any metal salt which does not form insoluble nitrate salts can be used.

The metals and metal precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni, Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal or metal precursors used in the process of this disclosure can vary over a wide range and need only be a concentration sufficient to form the mesoporous metal titanates. The metal or metal precursors can be present in a molar concentration ratio of from about $1 \times 10^{-2}$ M to about 10 M, preferably from about $1 \times 10^{-1}$ M to about 5 M, and more preferably from about $5 \times 10^{-1}$ M to about 1 M (based on a total volume of 10 milliliters)

In certain embodiments of the methods of the invention, the soft template material is a surfactant.

The surfactants useful in the processes of this disclosure can be any anionic, cationic, non-ionic, zwitterionic surfactant, or mixtures thereof. The surfactants are conventional materials known in the art and are commercially available.

One or more surfactants, e.g., a surfactant and co-surfactant, are useful in the processes of this disclosure. Physicochemical properties of the mesoporous metal titanate materials of this disclosure can be controlled by the use of mixed surfactants in the synthesis thereof.

The use of a co-surfactant in the synthesis of mesoporous metal titanate materials synthesized with Pluronic® P123 surfactant:co-surfactant significantly affects the physicochemical properties obtained for the resulting mesoporous materials.

Illustrative surfactants include, for example, anionic, cationic, non-ionic, zwitterionic, or mixtures thereof. This may be a polymeric surfactant, and may be a copolymer surfactant. The copolymer surfactant may be a block copolymer, or may be a random copolymer, an alternating copolymer or some other type of copolymer. The block copolymer may be a diblock, triblock or other copolymer. The block copolymer may have between 2 and 5 blocks or more than 5 blocks. The material may have an odd or an even number of blocks, and may have 2, 3, 4 or 5 blocks. The block copolymer may have hydrophilic blocks alternating with hydrophobic blocks. The terminal blocks may be hydrophobic, or may be hydrophilic, or one may be hydrophilic and one hydrophobic. The copolymer surfactant may have 2, 3, 4, 5 or more than 5 different types of blocks (i.e. different monomers). The material may be an alkylene oxide block copolymer surfactant. The system may be an EO/PO copolymer surfactant, e.g. an EO/PO block copolymer surfactant. Suitable surfactants include Pluronic® P65 ($HO(CH_2CH_2O)_{20}(CH_2CH(CH_3)O)_{30}(CH_2CH_2O)_{20}H$) or (EO20PO30EO20), Pluronic® P85 ($HO(CH_2CH_2O)_{26}(CH_2CH(CH_3)O)_{40}(CH_2CH_2O)_{26}H$) or (EO26PO40EO26), Pluronic® 25R4 (PO19EO33PO19), Pluronic® F108 ($HO(CH_2CH_2O)_{129}(CH_2CH(CH_3)O)_{56}(CH_2CH_2O)_{129}H$) or (EO129PO56EO129), Pluronic® P123 ($HO(CH_2CH_2O)_{20}(CH_2CH(CH_3)O)_{70}(CH_2CH_2O)_{20}H$) or (EO20PO70EO20) and Pluronic® F127 ($HO(CH_2CH_2O)_{97}(CH_2CH(CH_3)O)_{69}(CH_2CH_2O)_{97}H$) or (EO97PO69EO97). The surfactant may be miscible or immiscible, or may be partially miscible, with the interface modifier.

Preferred surfactants useful in the process of this disclosure can be represented by the formula: ($HO(CH_2CH_2O)_n(CH_2CH(CH_3)O)_m(CH_2CH_2O)_nH$), wherein m is a value from about 10 to about 150, preferably from about 20 to about 100, and more preferably form about 20 to about 70, and n is a value from about 5 to about 150, preferably from about 10 to about 70, and more preferably form about 10 to about 30.

Other preferred surfactants useful in the process of this disclosure can be represented by the formula: $(PPO))_x(PEO)_y(PPO)_z$, wherein PPO is polypropylene oxide, PEO is polyethylene oxide, and x, y and z are values sufficient for the surfactant to have a hydrophilic-lipophilic balance (HLB) from about 1 to about 18, preferably from about 1 to about 12, and more preferably from about 3 to about 7.

Other illustrative surfactants useful in the process of this disclosure include, for example, a Triton® surfactant, a Tween® surfactant, glucose, or an AB or BC polymer surfactant, wherein A is polyisoprene butylene, B is styrene, and C is selected from glucose, amine, carboxyl group-containing compound, and polyethylene glycol (PEG).

Still other illustrative surfactants include an ethoxylated castor oil, an ethoxylated coconut fatty acid, or an amidified, ethoxylated coconut fatty acid.

An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE(20) castor oil; POE (20) castor oil (ether, ester); POE(3) castor oil, POE(40) castor oil, POE(50) castor oil, POE(60) castor oil, or polyoxyethylene (20) castor oil (ether, ester).

An ethoxylated coconut fatty acid can include, for example, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monoconate polyethylene glycol, monococonut oil fatty acid ester of polyethylene glycol, polyoxyethylene (15) monococoate, polyoxyethylene (5) monococoate, or polyoxyethylene (8) monococoate.

An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

The surfactant can be, for example, one or more of Alfoterra® 123-8S, Alfoterra® 145-8S, Alfoterra® L167-7S, Ethox® HCO-5, Ethox® HCO-25, Ethox® CO-40, Ethox® ML-5, Ethal® LA-4, AG-6202, AG-6206, Ethox® CO-36, Ethox® CO-81, Ethox® CO-25, Ethox® TO-16, Ethsorbox® L-20, Ethox® MO-14, S-MAZ 80K, T-MAZ 60 K 60, Tergitol® L-64, Dowfax® 8390, Alfoterra® L167-4S, Alfoterra® L123-4S, and Alfoterra® L145-4S.

The surfactant can be, for example, one or more of castor oil, cocoa oil, cocoa butter, coconut oil, soy oil, tallow oil, cotton seed oil, a naturally occurring plant oil and a plant extract. Further, the surfactant can be, for example, one or more of an alkyl polyglucoside or an alkyl polyglucoside-based surfactant, a decyl polyglucoside or an alkyl decylpolyglucoside-based surfactant.

The mesoporous metal titanate s f this disclosure are unique types of materials that can be prepared by a synthesis using various surfactants and surfactant mixtures for fine tuning physicochemical properties of final mesoporous materials.

In particular embodiments, the soft template material is an EO/PO block copolymer surfactant. In still more particular embodiments, the EO/PO block copolymer surfactant is e Pluronic® P65 $(HO(CH_2CH_2O)_{20}(CH_2CH(CH_3)O)_{30}(CH_2CH_2O)_{20}H)$ or (EO20PO30EO20), Pluronic® P85 $(HO(CH_2CH_2O)_{26}(CH_2CH(CH_3)O)_{40}(CH_2CH_2O)_{26}H)$ or (EO26PO40EO26), Pluronic® 25R4 (PO19EO33PO19), Pluronic® F108 $(HO(CH_2CH_2O)_{129}(CH_2CH(CH_3)O)_{56}(CH_2CH_2O)_{129}H)$ or (EO129PO56EO129), Pluronic® P123 $(HO(CH_2CH_2O)_{20}(CH_2CH(CH_3)O)_{70}(CH_2CH_2O)_{20}H)$ or (EO20PO70EO20) and Pluronic® F127 $(HO(CH_2CH_2O)_{97}(CH_2CH(CH_3)O)_{69}(CH_2CH_2O)_{97}H)$ or (EO97PO69EO97).

In a particular embodiment of the invention, the EO/PO block copolymer surfactant is Pluronic® P123.

Surfactant types useful in this disclosure can synthetically be created by combination of nonionic and ionic functional groups mentioned above. A combination of ionic surfactants (anionic and cationic) can be useful in this disclosure since they may have different phase behavior. Multiple, strong hydrogen bonding interaction between two nonionic surfactants can yield a new type of nonionic surfactant having different phase behaviors than the behaviors of the individual surfactants used to form the new nonionic surfactant. A combination of ionic liquids and ionic surfactants can also yield a new type of surfactant useful in this disclosure.

Ionic surfactants have been found to be more effective for increasing the hydrophilic interaction since ionic character of the surfactants sucks more water into the core region. With the method of this disclosure, one can easily control the physicochemical parameters and the nano-crystal size and shape by using co-surfactants. Moreover, ionic surfactants also increase the obtained yield for the metal systems such as Fe, Mn, and Co.

Surfactant solubility and the metal source solubilizing potential of the surfactant are important parameters in this disclosure. Since, as long as the metal source is solubilized in the Pluronic® mesostructured material can be obtained.

The concentration of the surfactant used in the process of this disclosure can vary over a wide range and need only be a concentration sufficient to form the mesoporous metal titanates. The surfactant can be present in a molar concentration ratio of from about $1\times10^{-5}$ M to about 1 M, preferably from about $1\times10^{-4}$ M to about $1\times10^{-1}$ M, and more preferably from about $1\times10^{-3}$ M to about $1\times10^{-2}$M (based on a total volume of 10 milliliters).

In certain embodiments of the methods of the invention, the reaction mixture comprises 0.01 mol of metal, 0.01 mol of titanium source, 0.23 mol of solvent, 0.034 mol of nitric acid, and $4.3\times10^{-4}$ mol of soft template.

In certain embodiments, organic and inorganic additives may be useful in the processes of this disclosure and can be any suitable organic or inorganic additives, including mixtures thereof. The organic and inorganic additives are conventional materials known in the art and are commercially available.

One or more organic and/or inorganic additives are useful in the processes of this disclosure. Physicochemical properties of the mesoporous metal titanates materials of this disclosure can be controlled by the use of mixed organic or inorganic additives in the synthesis thereof. The controlled formation of the mesoporous metal titanate materials of this disclosure makes the tuning of physicochemical properties of the materials possible using additives such as mixed organic and/or inorganic additives.

Illustrative organic additives include, for example, urea, hydrocarbons (decane, octane etc.), benzene, mesitylene or trimethyl benzene (TMB), substituted benzene (tri-isopropylene, ethylbenzene, etc.), polyethylene glycol, thiourea, ethylene diamime, styrene, pyrene, naphthalene, azobenzene, aromatic dye molecules (brilliant green, methylene blue, methyl orange, perylene bisimide, congo red etc.), naphthalene, phenolic compounds, formaldehyde, PPO, PEO, sugars (D-fructose, glucose, sucrose, cellulose, starch, etc.), citric acid, phenol, aromatic alcohols (benzyl alcohol, etc.), alcohols (pentanol, hexanol, 2-propanol, etc.), carboxylic acids (heptanic acid), phosphates (trimethyl phosphate), oleyl ether, lysine, glycine, glutamic acid, tosylate, and carboxyl.

In particular, illustrative organic additives include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, TMB, acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

Mesitylene (1,3,5-trimethylbenzene) (TMB) and other benzene organic derivatives can be used in the synthesis of mesoporous materials as pore swelling agent and increasing the meso-order of the synthesized Pluronic® surfactant based mesoporous materials. Organic additives might vary depending on the surfactant system. The key in selecting an organic additive is synergy between the additive and surfactant. Aromatic molecules are known to have a strong interaction with the relatively hydrophobic polypropylene oxide group (PPO) of the Pluronic® surfactants. TMB can be replaced with another benzene derivative or any organic molecule containing an aromatic ring including dye molecules. Another surfactant having different hydrophilic-hydrophobic groups or different types of surfactants such as star type, bis, charged surfactants can use other types of organic additives such as polyethylene glycol, and n-alcohols.

The calcining step is not particularly limited with regard to temperature, ramp rate or time. In certain embodiments of the invention, the calcining step is performed at 150-700° C. at about 2° C./min-25° C./min ramp rate under air. In still other embodiments, the calcining step is performed from 1-12 hours. In other embodiments, the calcining step is performed at a ramp rate of about 2° C./min-10° C./min or of about 5° C./min-10° C./min.

In particular embodiments, the dried powder is calcined in the following manner Firstly, the dried powder is heated at a temperature from about 100° C. to about 200° C., preferably from about 125° C. to about 175° C., and more preferably from about 140° C. to about 160° C., for a period from about 2 to about 20 hours, preferably from about 4 to about 18 hours, and more preferably from about 6 to about 16 hours. Secondly, the dried powder is heated at a temperature from about 200° C. to about 300° C., preferably from about 225° C. to about 275° C., and more preferably from about 240° C. to about 260° C., for a period from about 1 to about 10 hours, preferably from about 2 to about 8 hours, and more preferably from about 2 to about 6 hours. Thirdly, the dried powder is heated at a temperature from about 300° C. to about 400° C., preferably from about 325° C. to about 375° C., and more preferably from about 340° C. to about 360° C., for a period from about 1 to about 8 hours, preferably from about 1 to about 7 hours, and more preferably from about 1 to about 6 hours. Fourthly, the dried powder is heated at a temperature from about 400° C. to about 500° C., preferably from about 425° C. to about 475° C., and more preferably from about 440° C. to about 460° C., for a period from about 0.5 to about 5 hours, preferably from about 1 to about 4 hours, and more preferably from about 1 to about 3 hours. Fifthly, the dried powder is heated at a temperature from about 500° C. to about 600° C., preferably from about 525° C. to about 575° C., and more preferably from about 540° C. to about 560° C., for a period from about 0.1 to about 2 hours, preferably from about 0.25 to about 2 hours, and more preferably from about 0.5 to about 2 hours.

Applications

As synthesized, high surface area mesoporous metal titanates can act as multifunctional catalysts. As such, in another aspect, the invention provides a multifunctional catalyst comprising a mesoporous metal titanate of the invention.

Nitrosobenzene is a versatile intermediate in many organic reactions such as synthesis of oxindoles,[70] azomethine derivatives, allylamines,[71] oxazines,[72] Diels alder products[73] and aldol compounds.[74] The conventional methods of the nitrosobenzene synthesis involves in toxic reagents such as peracetic[75] acid and perbenzoic acid.[76] As alternative catalysts, E. Moller et al. have used molybdenum complexes,[76] and M. Alizadeh et al. have reported heteropolyoxometalate catalysts. However, the usage of homogeneous catalysts accompanies difficult separation processes. As a solution, researchers have paid attention towards heterogeneous catalysts and Y. Shiraishi et al. have reported the oxidation of aniline to nitrosobenzene using Pt supported on $TiO_2$,[77] and B. Priewisch et al. have studied the oxidation reaction using methyltrioxorhenium, $SeO_2$, and $Na_2WO_4$ catalysts.[78] However, the aforementioned systems have the disadvantages of having expensive noble metals and the need of additives such as $H_3PO_4$, and TBABr (tetrabutylammonium bromide). Thus, a strategy is desired for the development of less toxic, heterogeneous, and economic catalysts. Herein, novel mesoporous metal titanates are introduced for the green oxidation of aniline to nitrosobenzene.

Tungsten titanate can be used for the oxidation of aniline to nitrosobenzene in the presence of hydrogen peroxide ($H_2O_2$) as the oxidant. The reaction completes within 30 minutes at room temperature with >99% selectivity and >99% conversion. the catalyst does not show leaching and can be reused up to 4 cycles without any significant loss in the activity. When the reaction was carried out in the presence of different oxidants (air and $O_2$) there was no conversion. The reaction conditions were optimized by changing the reaction time, temperature, amount of catalyst used, amount of oxidant ($H_2O_2$) used, and the solvent used. The substrate scope was evaluated using substituted aniline derivatives. All the products were analyzed using gas chromatography mass spectrometry (GCMS). According to the suggested mechanism, the reaction proceeds through a radical mediated pathway and it has been proved using EPR and radical inhibition.

Furthermore, as synthesized mesoporous tungsten titanate is used for the reaction between benzaldehyde and methanol at room temperature to produce benzaldehyde dimethyl acetal and for the room temperature oxidation of dibenzothiophene. Both mesoporous vanadium titanate and cerium titanate are used for the conversion of aniline to azobenzene and the dehydrogenation of tetrahydro quinoline to produce isoquinoline. Similarly, cobalt titanate and copper titanate are used for the oxidation of aniline to azoxybenzene. Nickel titanate is used for the alcohol dehydrogenation and conversion of ethanol to high energy hydrocarbons.

Oxindoles which can be derived from nitrosobenzene has medicinal applications such as antiviral, antifungal, antibacterial, antiproliferative, anticancer, anti-inflammatory, antihypertensive and anticonvulsant agents. Benzaldehyde dimethyl acetal is an FDA approved food additive. Azobenzene derivatives can be used as a photo pharmaceutical agent[79] for targeted drug actions. Isoquinolines are important for the production of dyes, paints antifungal agents and insecticides.[80] Moreover, it can be used as a corrosion inhibitor.

Other uses and applications of specific metal titanates include, but are not limited to:

a) Nickel titanate—lithium-ion battery anodes with high reversible capacity and high-rate long-cycle life performance;[81] yellow pigment in paints;[82] catalyst in acid fuel cells.[83]

b) Ni in Strontium Titanate—Flexible Nonvolatile Memory Applications.[84]

c) Sodium titanate—inorganic ion-exchangers—One of the sodium titanates, referred to as monosodium titanate, is currently used at the Savannah River Site in a batch-contact process to separate 90 Sr and alpha-emitting radioisotopes from high-level nuclear waste solutions.[85]

d) Aluminum titanate ceramics are commercially used in the casting industry. In the automotive industry they are also sporadically used as claddings of port liners and spacer segments between catalyst substrates. The outstanding characteristic of aluminum titanate ceramics is their excellent thermal shock resistance, the result of the very low thermal expansion coefficient and Young's modulus.[86]

e) Lead titanate (PbTiO$_3$)—a ferroelectric material with a variety of applications which involve multilayer capacitors, resonators, and ultrasonic transducers.

f) Zinc titanate—that can scrub sulfur impurities from petroleum-based fuels.[87]

g) Bismuth Sodium Titanate—a ferroelectric ceramic material for a lead-free piezoelectric actuator, capacitors.[88]

h) Copper Calcium Titanate—gas sensing.[89]

EXAMPLES

The embodiments described above in addition to other embodiments can be further understood with reference to the following examples:

Example 1—Synthesis of Metal Titanate

The novel, metal dissolution approach is used for the synthesis of mesoporous metal titanates where metal: Ti ratio will be 1:1.

First, the metal is dissolved in hydrogen peroxide and/or nitric acid followed by the addition of a solvent mixture containing 1-butanol (70%), nitric acid (20%), and Pluronic 123 surfactant (10%). Then the mixture is stirred overnight followed by the removal of solvent at 120° C. in an oven. The resultant foam is washed with ethanol and dried in a vacuum oven. Finally, the powder obtained is calcined.

An optimum reaction mixture will consist of 0.01 mol of metal, 0.01 mol of titanium (IV)butoxide, 0.23 mol of 1-butanol, 0.034 mol of nitric acid, and $4.3 \times 10^{-4}$ mol of Pluronic 123. The calcination temperatures are 150° C., 250° C., 350° C., 450° C., and 700° C. for 12, 3, 2, 1, and 12 hours respectively.

Figure 2:
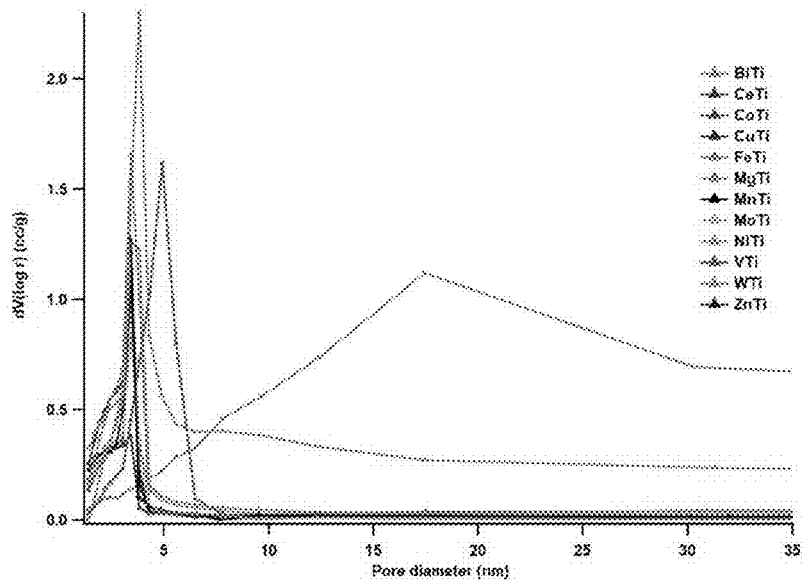
FIG. 2 illustrates the BJH pore size distribution of exemplary metal titanates of the invention.

As synthesized material show high surface areas and monomodal pore size distributions where the average pore diameters are in the range of 2-7 nm (see Table 2). The nitrogen sorption isotherms consist of type IV hysteresis isotherms (FIG. 1) and the BJH pore size distribution curves show the monomodal nature (FIG. 2). The crystallite sizes obtained from XRD analysis using Debye Scherrer equation ranges from 1-40 nm.

TABLE 2

BET Surface area and BJH results of the as synthesized materials

| Sample | BET Surface Area (m$^2$/g) | BJH Pore Volume (cc/g) | Pore Diameter (nm) |
| --- | --- | --- | --- |
| Bi/Ti | 214 | 0.70 | 2.0 |
| Ce/Ti | 365 | 0.30 | 3.8 |
| Co/Ti | 404 | 0.24 | 3.8 |
| Cu/Ti | 229 | 0.20 | 2.0 |
| Fe/Ti | 353 | 0.15 | 3.4 |
| Mg/Ti | 416 | 0.76 | 3.8 |
| Mn/Ti | 511 | 0.10 | 2.8 |
| Mo/Ti | 245 | 0.18 | 3.4 |
| Ni/Ti | 423 | 0.26 | 3.8 |
| V/Ti | 252 | 0.32 | 4.9 |
| W/Ti | 295 | 0.28 | 3.4 |
| Zn/Ti | 282 | 0.22 | 3.8 |

Figure 3:
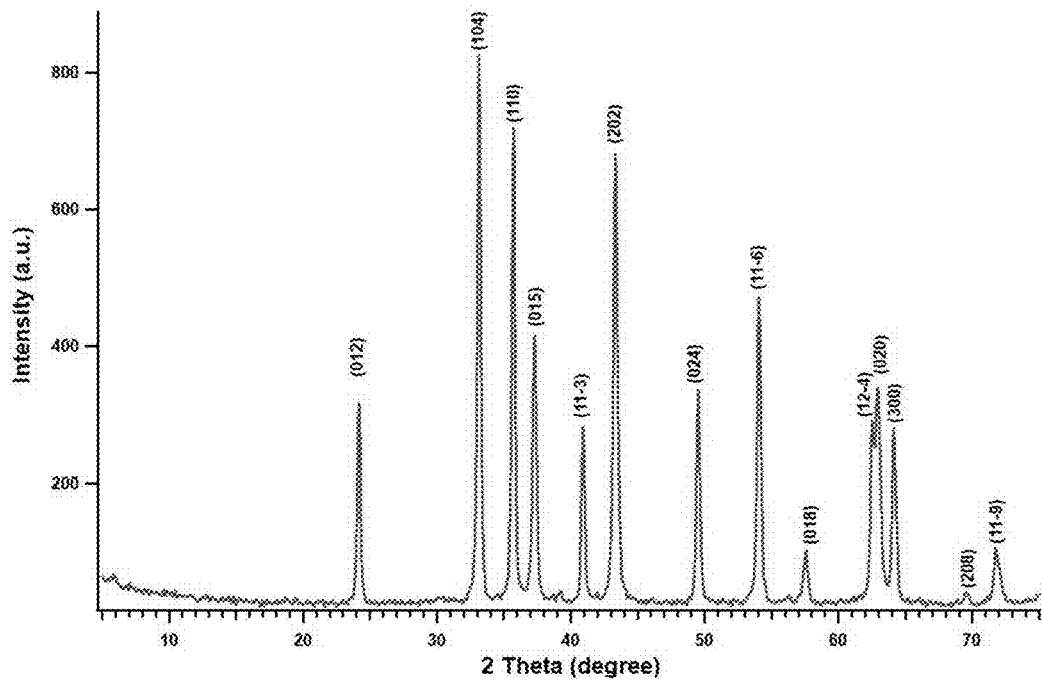
FIG. 3 illustrates the PXRD pattern pore size distribution of an exemplary $NiTiO_3$ catalyst of the invention.
Figure 4:
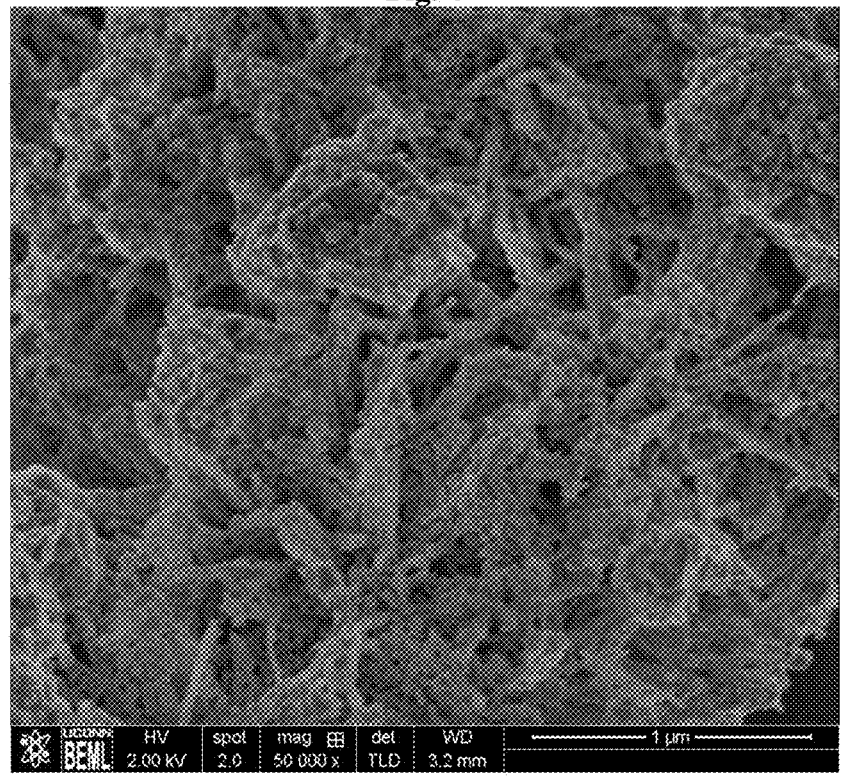
FIG. 4 provides an SEM image of an exemplary mesoporous $NiTiO_3$ catalyst of the invention.
Figure 5:
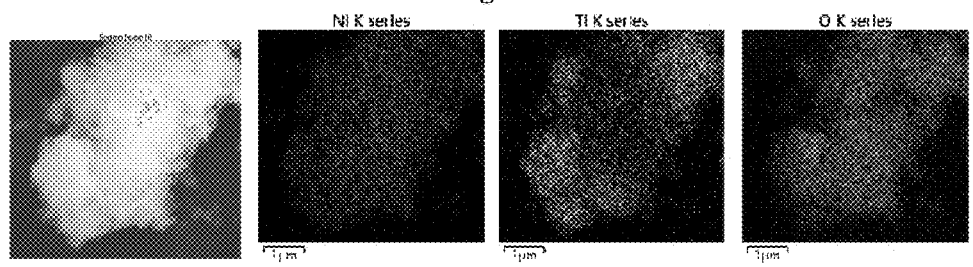
FIG. 5 provides EDX elemental mapping images of an exemplary mesoporous $NiTiO_3$ catalyst of the invention.
Figure 6:
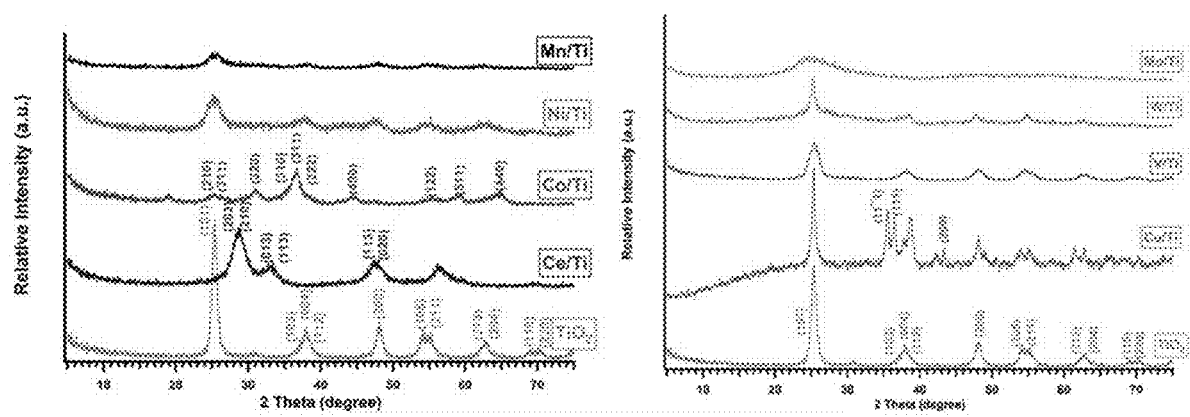
FIG. 6 provides X-Ray Diffraction Analysis of exemplary metal titanates of the invention calcined at 250° C./350° C.
Figure 7:
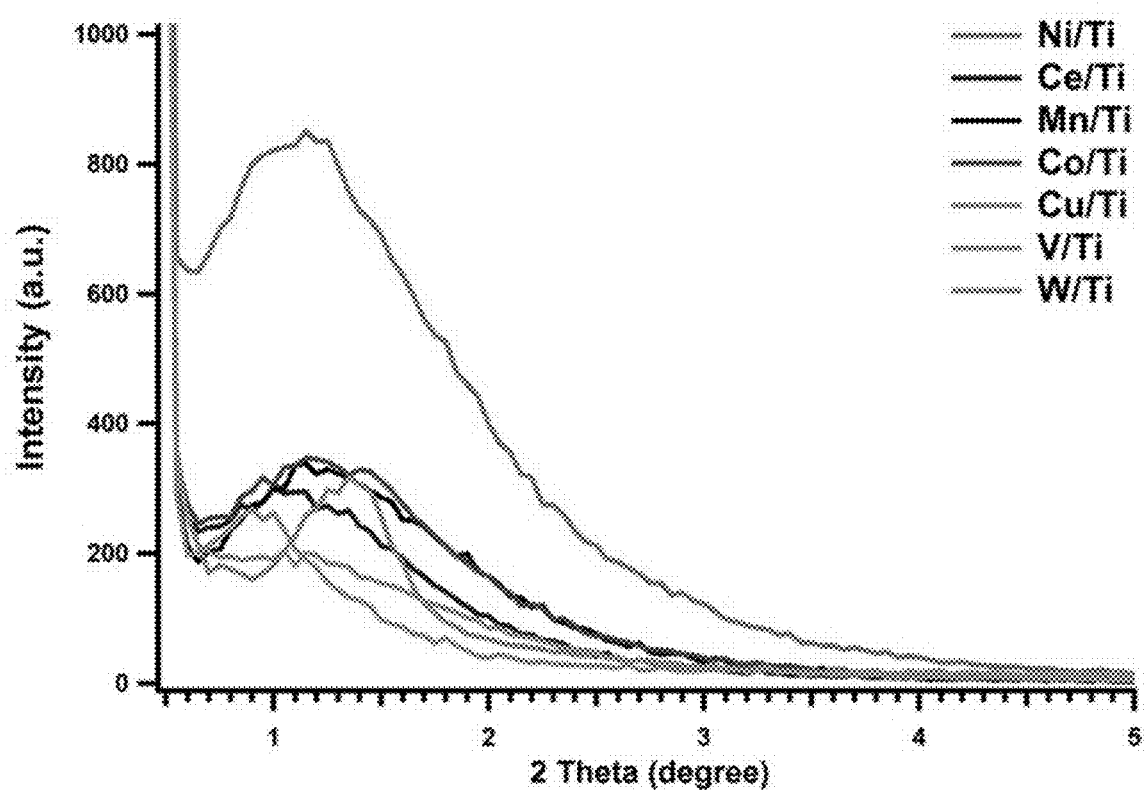
FIG. 7 provides a low angle X-Ray Diffraction Analysis of exemplary metal titanates of the invention calcined at 250° C./350° C.
Figure 8:
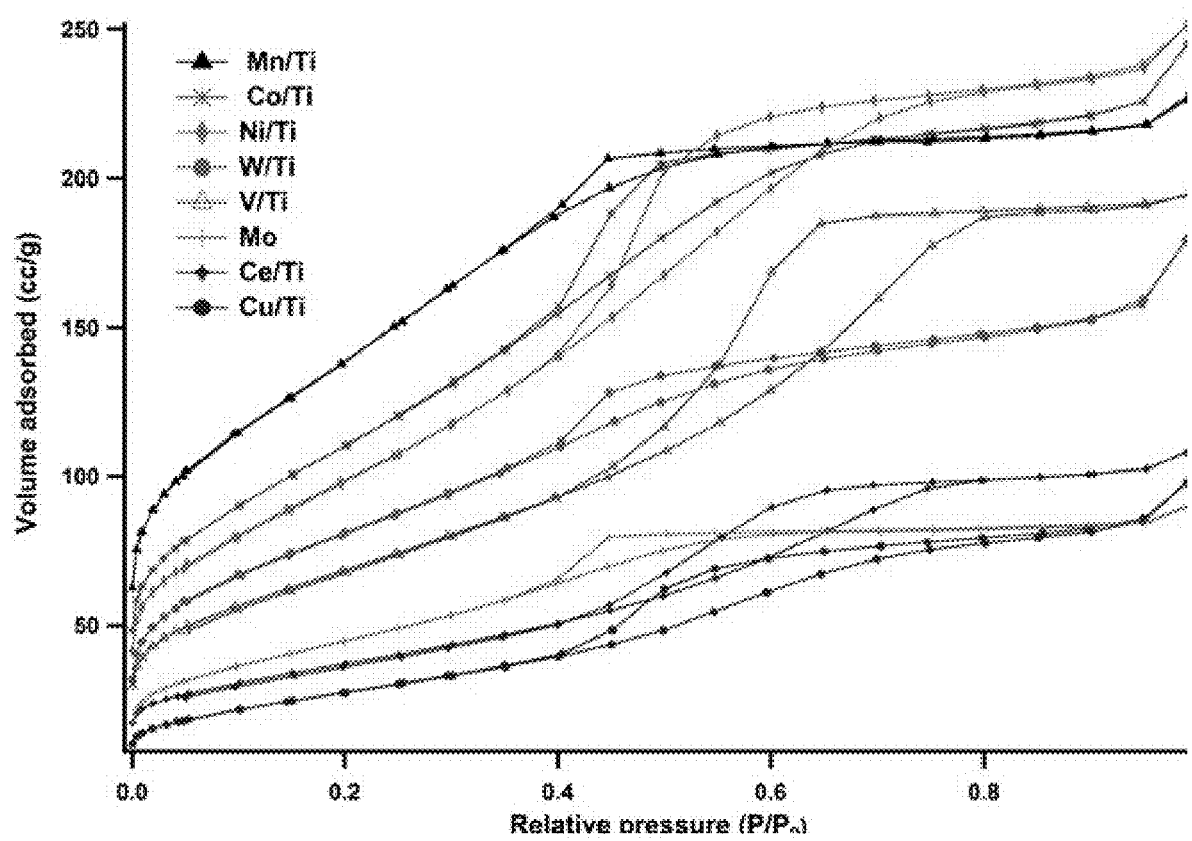
FIG. 8 illustrates BET Analysis of exemplary metal titanates of the invention calcined at 250° C./350° C.
Figure 9:
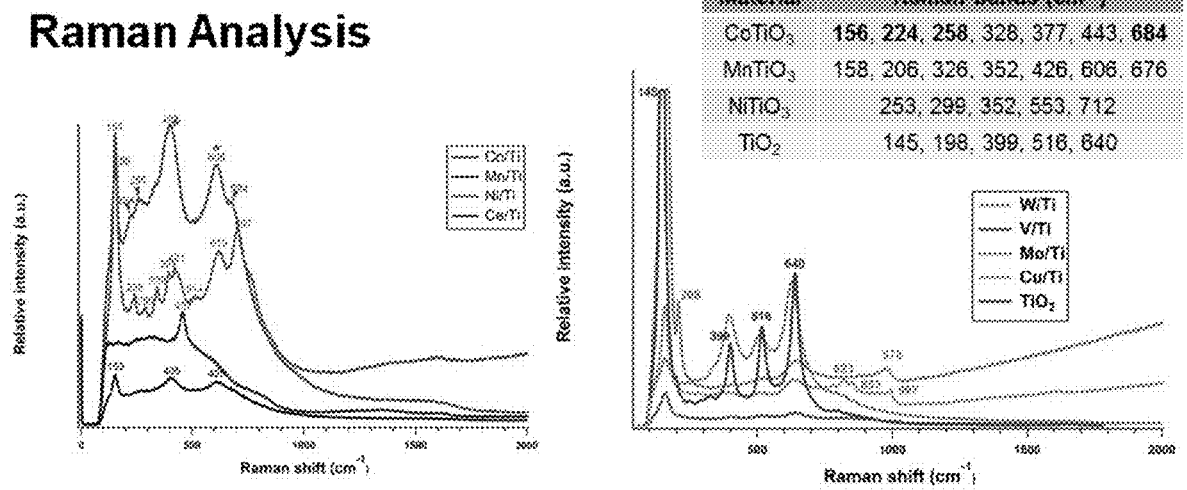
FIG. 9 illustrates Raman Analysis of exemplary metal titanates of the invention calcined at 250° C./350° C.
Figure 10:
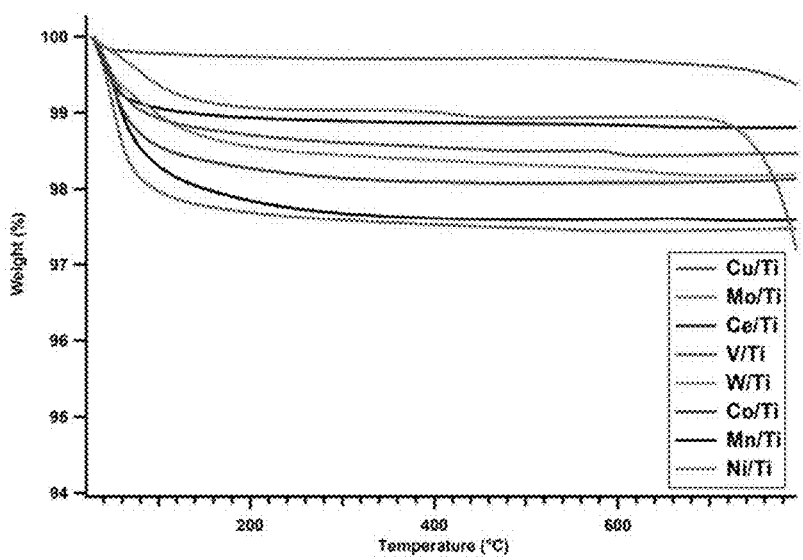
FIG. 10 illustrates thermogravimetric analysis (TGA) of exemplary metal titanates of the invention—Sample weight 15 mg, Ramp: 10° C., $N_2$ flow: 60 mL/min.
Figure 11:
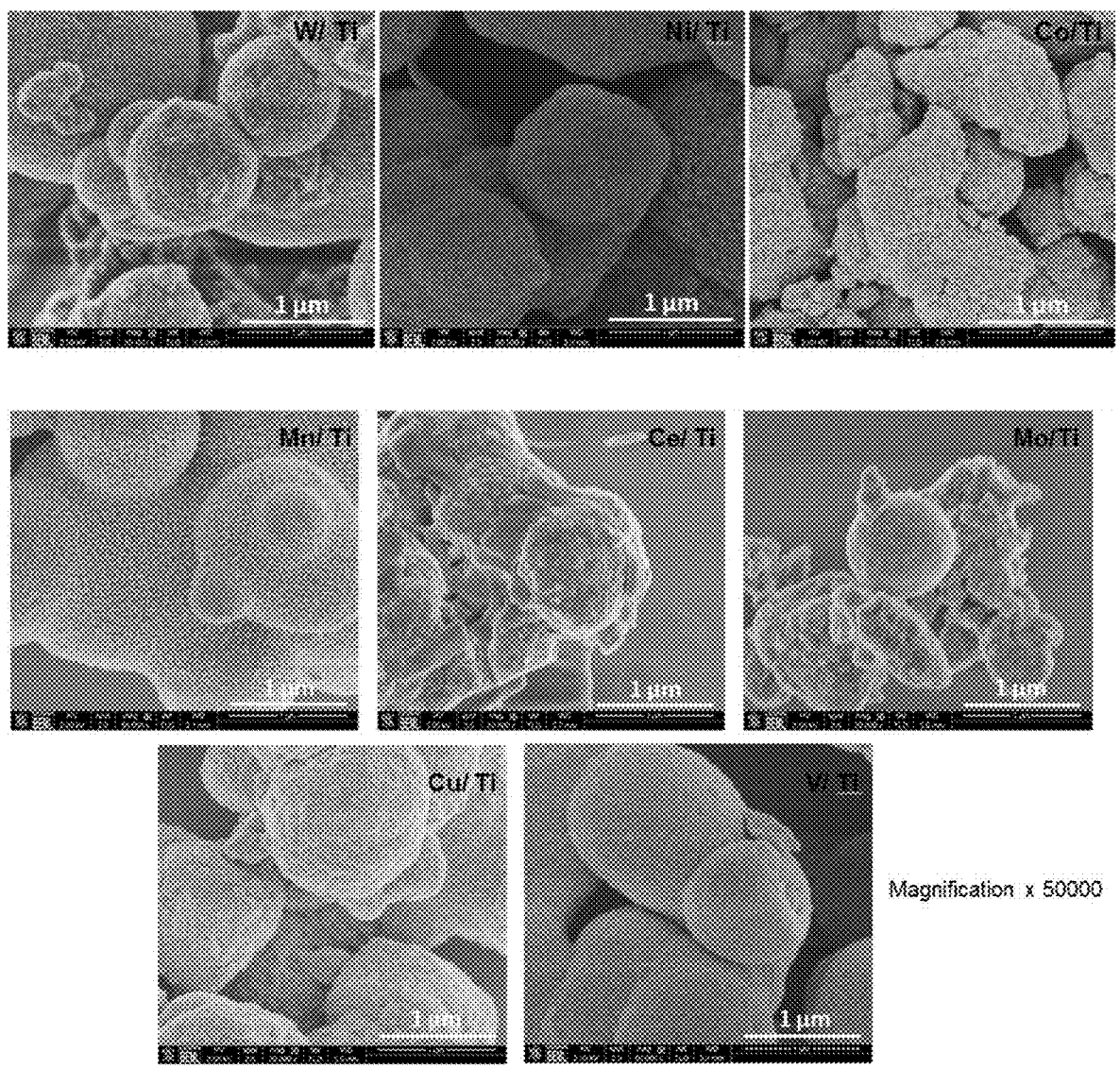
FIG. 11 provides SEM images of exemplary metal titanates of the invention at 50000 magnification.
Figure 12:
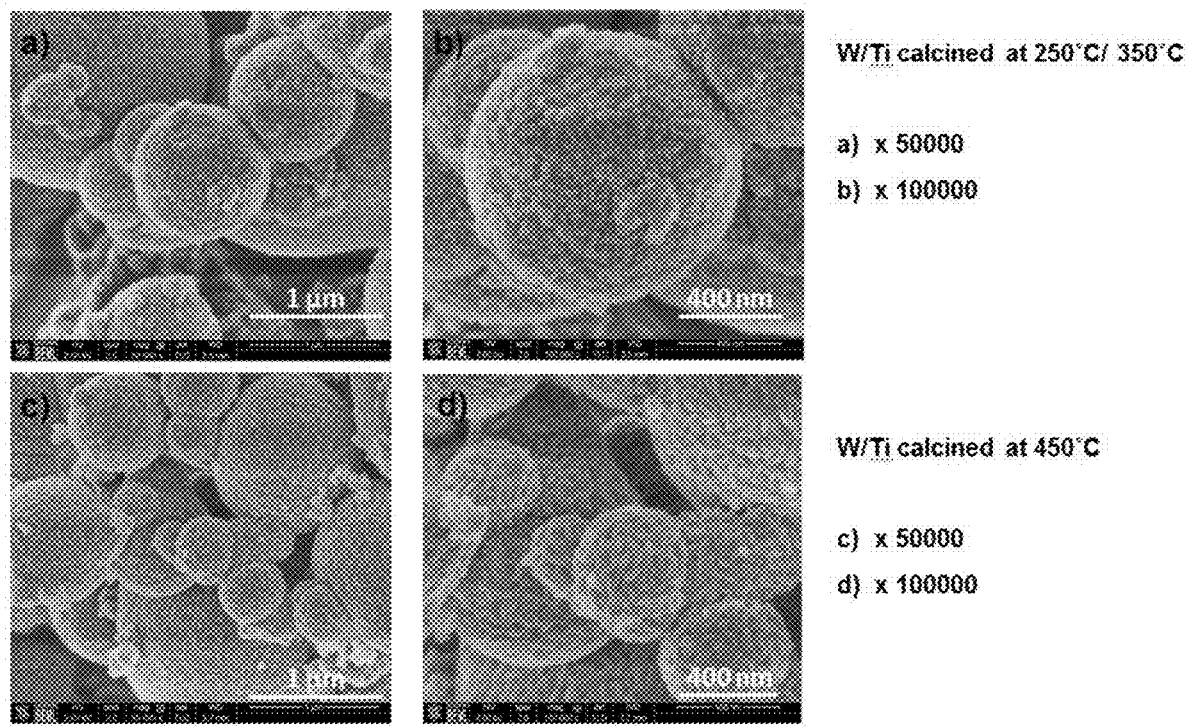
FIG. 12 provides SEM images of exemplary tungsten titanates calcined at 250° C./350° C. and at 450° C.
Figure 13:
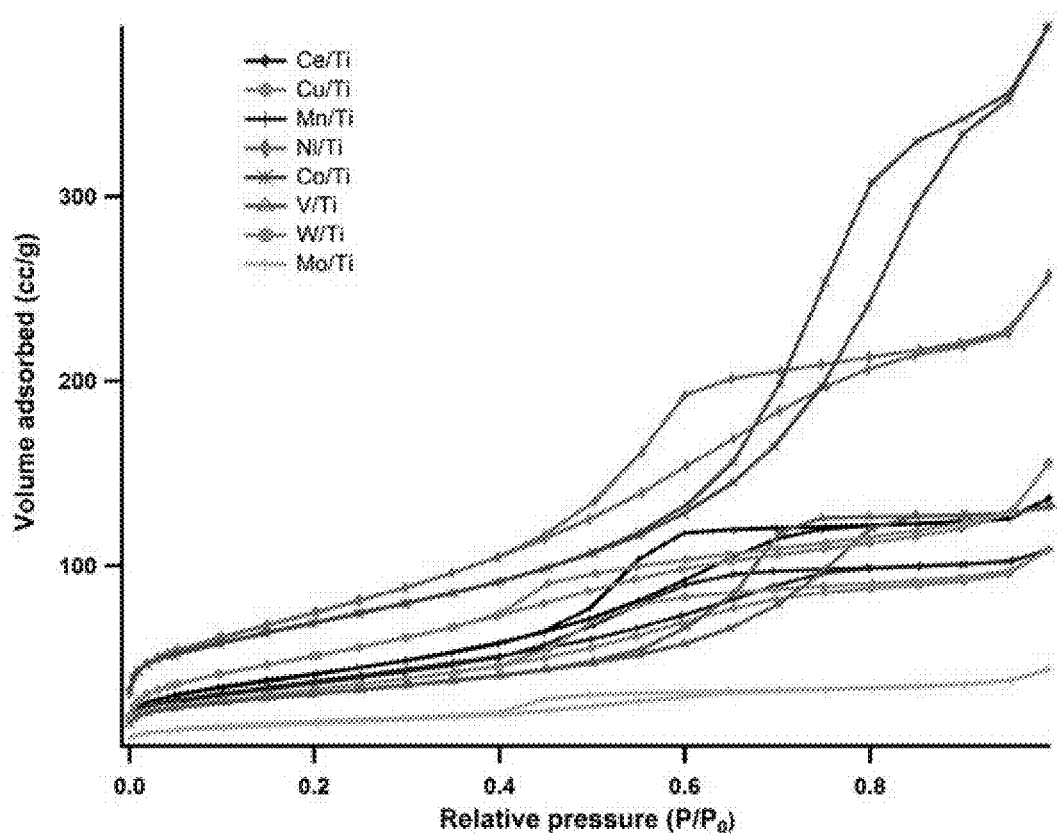
FIG. 13 illustrates BET Analysis of exemplary metal titanates of the invention calcined at 450° C.
Figure 14:
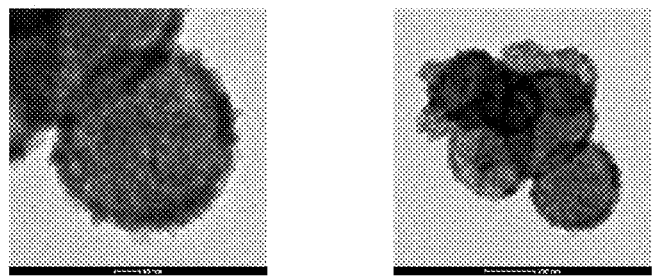
FIG. 14 provides a TEM image of an exemplary mesoporous W/Ti catalyst of the invention.
Figure 15:
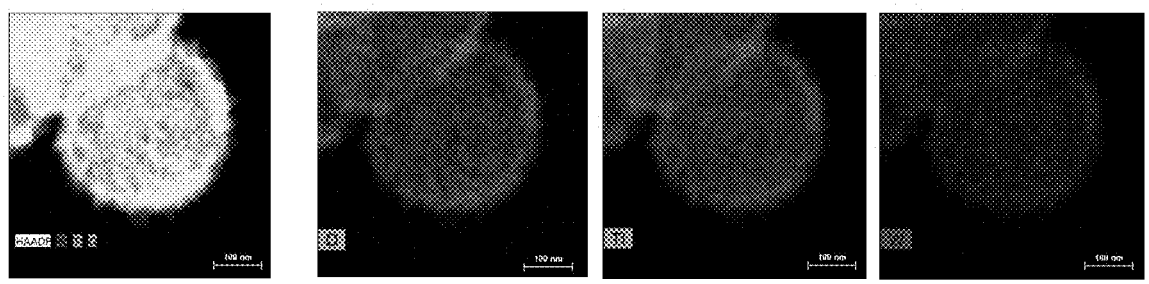
FIG. 15 provides a TEM elemental mapping images of an exemplary mesoporous W/Ti catalyst of the invention.

Mesoporous NiTiO$_3$ has gained much attention among the others and the structural and surface characterization of the material is given below. The powder X-ray diffraction (PXRD) analysis (FIG. 3) shows the NiTiO$_3$ crystal structure and the scanning electron microscopic (SEM) analysis (FIG. 4) shows the morphology. The energy dispersive X-ray (EDX) analysis (FIG. 5) shows the homogeneous distribution of Ni and Ti elements throughout the material.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

REFERENCES (1) Moghiminia, S.; Farsi, H.; Raissi, H. *Electrochim. Acta* 2014, 132, 512-523.

(2) Shukla, T.; Yadav, B.; Tandon, P. *Sens. Lett.* 2011, 9 (2), 533-540(8).

(3) Siemons, M.; Simon, U. *Sensors Actuators, B Chem.* 2007, 126 (2), 595-603.

(4) Della Gaspera, E.; Pujatti, M.; Guglielmi, M.; Post, M. L.; Martucci, A. *Mater. Sci. Eng. B Solid-State Mater. Adv. Technol.* 2011, 176 (9), 716-722.

(5) Ehsan, M. A.; Naeem, R.; Khaledi, H.; Sohail, M.; Hakeem Saeed, A.; Mazhar, M. *Dalt. Trans.* 2016, 45 (25), 10222-10232.

(6) Shilpy, M.; Ehsan, M. A.; Ali, T. H.; Abd Hamid, S. B.; Ali, M. E. *RSC Adv.* 2015, 5 (97), 79644-79653.

(7) Kamide, K.; Miyakawa, Y. *Die Makromol. Chemie* 1978, 372 (3), 359-372.

(8) Traistaru, G. A.; Covaliu, C. I.; Matei, V.; Cursaru, D.; Jitaru, I. Dig. *J. Nanomater. Biostructures* 2011, 6 (3), 1257-1263.

(9) Miro, E.; Santamaria, J.; Wolf, E. E. *J. Catal.* 1990, 124 (2), 451-464.

(10) Krylova, G.; Brioude, A.; Ababou-Girard, S.; Mrazek, J.; Spanhel, L. *Phys. Chem. Chem. Phys.* 2010, 12 (45), 15101.

(11) Cal, Y.; Ye, Y.; Tian, Z.; Liu, J.; Liu, Y.; Liang, C. *Phys. Chem. Chem. Phys.* 2013, 15 (46), 20203.

(12) Stanca, S. E.; Müller, R.; Urban, M.; Csaki, A.; Froehlich, F.; Krafft, C.; Popp, J.; Fritzsche, W. *Catal. Sci. Technol.* 2012, 2 (7), 1472-1479.

(13) Yuan, P. H.; Fan, C. M.; Ding, G. Y.; Wang, Y. F.; Zhang, X. C. *Int. J. Miner. Metall. Mater.* 2012, 19 (4), 372-376.

(14) Xin, S.; Jing, H.; Dong, C. *Ind. Eng. Chem. Res.* 2008, 47 (14), 4750-4753.

(15) Kharkwal, M.; Uma, S.; Nagarajan, R. *Ind. Eng. Chem. Res* 2010, 3 (i), 1995-1996.

(16) Sadjadi, M. S.; Mozaffari, M.; Enhessari, M.; Zare, K. *Superlattices Microstruct.* 2010, 47 (6), 685-694.

(17) Guo, S.; Liu, J.; Qiu, S.; Liu, W.; Wang, Y.; Wu, N.; Guo, J.; Guo, Z. *J. Mater. Chem. A* 2015, 3 (47), 23895-23904.

(18) Taylor, D. J.; Fleig, P. F.; Schwab, S. T.; Page, R. A. In *Surface and Coatings Technology;* 1999; Vol. 120-121, pp 465-469.

(19) Cheraghi, H.; Shahmiri, M.; Sadeghian, Z. In *Thin Solid Films;* 2012; Vol. 522, pp 289-296.

(20) Pishch, I. V; Radion, E. V. *PRODUCTION OF PIGMENTS WITH A PEROVSKITE-LIKE STRUCTURE BASED ON NICKEL TITANATE BY THE PRECIPITATION METHOD;* 2003.

(21) Wang, J. L.; Li, Y. Q.; Byon, Y. J.; Mei, S. G.; Zhang, G. L. *Powder Technol.* 2013, 235, 303-306.

(22) Hajjaji, W.; Costa, G.; Zanelli, C.; Ribeiro, M. J.; Seabra, M. P.; Dondi, M.; Labrincha, J. A. *J. Eur. Ceram. Soc.* 2012, 32 (4), 753-764.

(23) Arrive, C.; Delahaye, T.; Joubert, O.; Gauthier, G. *J. Power Sources* 2013, 223, 341-348.

(24) Tsuda, M.; Arai, H.; Takahashi, M.; Ohtsuka, H.; Sakurai, Y.; Sumitomo, K.; Kageshima, H. *J. Power Sources* 2005, 144 (1), 183-190.

(25) Yamamoto, O.; Takeda, Y.; Kanno, R.; Noda, M. *Solid State Ionics* 1987, 22 (2-3), 241-246.

(26) Yuvaraj, S.; Nithya, V. D.; Fathima, K. S.; Sanjeeviraja, C.; Selvan, G. K.; Arumugam, S.; Selvan, R. K. *Mater. Res. Bull.* 2013, 48 (3), 1110-1116.

(27) Lin, Y. J.; Chang, Y. H.; Yang, W. D.; Tsai, B. S. *J. Non. Cryst. Solids* 2006, 352 (8), 789-794.

(28) Vijayalakshmi, R.; Rajendran, V. *E-Journal Chem.* 2012, 9 (1), 282-288.

(29) Murugan, A. V.; Samuel, V.; Navale, S. C.; Ravi, V. *Mater. Lett.* 2006, 60 (15), 1791-1792.

(30) Sharma, Y. K.; Kharkwal, M.; Uma, S.; Nagarajan, R. *Polyhedron* 2009, 28 (3), 579-585.

(31) Ni, Y.; Wang, X.; Hong, *J. Mater. Res. Bull.* 2009, 44 (8), 1797-1801.

(32) Ni, Y.; Wang, X.; Hong, *J. Mater. Res. Bull.* 2009, 44 (8), 1797-1801.

(33) Dharmaraj, N.; Park, H. C.; Kim, C. K.; Kim, H. Y.; Lee, D. R. *Mater. Chem. Phys.* 2004, 87 (1), 5-9.

(34) Gupta, V.; Bamzai, K. K.; Kotru, P. N.; Wanklyn, B. M. *Mater. Chem. Phys.* 2005, 89 (1), 64-71.

(35) Lopes, K. P.; Cavalcante, L. S.; Sim??es, A. Z.; Gon??alves, R. F.; Escote, M. T.; Varela, J. A.; Longo, E.; Leite, E. R. *J. Sol-Gel Sci. Technol.* 2008, 45 (2), 151-155.

(36) Lopes, K. P.; Cavalcante, L. S.; Simões, A. Z.; Varela, J. A.; Longo, E.; Leite, E. R. *J. Alloys Compd.* 2009, 468 (1-2), 327-332.

(37) Zhang, X.; Wang, H.; Huang, A.; Xu, H.; Zhang, Y.; Yu, D.; Wang, B.; Yan, H. *J. Mater. Sci.* 2003, 38 (11), 2353-2356.

(38) Fang, D.; Huang, K.; Liu, S.; Luo, Z.; Qing, X.; Zhang, Q. *J. Alloys Compd.* 2010, 498 (1), 37-41.

(39) Luo, J.; Xing, X.; Yu, R.; Xing, Q.; Liu, G.; Zhang, D.; Chen, X. *J. Alloys Compd.* 2006, 420 (1-2), 317-321.

(40) Mohammadi, M. R.; Fray, D. J. *Solid State Sci.* 2010, 12 (9), 1629-1640.

(41) Phani, A.; Santucci, S. *Thin Solid Films* 2001, 396 (1-2), 1-4.

(42) Sadjadi, M. S.; Zare, K.; Khanahmadzadeh, S.; Enhessari, M. *Mater. Lett.* 2008, 62 (21-22), 3679-3681.

(43) Qu, Y.; Zhou, W.; Ren, Z.; Du, S.; Meng, X.; Tian, G.; Pan, K.; Wang, G.; Fu, H. *J. Mater. Chem.* 2012, 22 (32), 16471-16476.

(44) Taylor, D. J.; Fleig, P. F.; Page, R. A. *Thin Solid Films* 2002, 408 (1-2), 104-110.

(45) Brik, Y.; Kacimi, M.; Ziyad, M.; Brik, Y.; Bozon-Verduraz, F. *J. Catal.* 2001, 202 (1), 118-128.

(46) Chu, X.; Liu, X.; Meng, G. *Mater. Res. Bull.* 1999, 34 (5), 693-700.

(47) Bellam, J. B.; Ruiz-Preciado, M. A.; Edely, M.; Szade, J.; Jouanneaux, A.; Kassiba, A. H. *RSC Adv.* 2015, 5 (14), 10551-10559.

(48) Song, Z. Q.; Wang, S. B.; Yang, W.; Li, M.; Wang, H.; Yan, H. *Mater. Sci. Eng. B Solid-State Mater. Adv. Technol.* 2004, 113 (2), 121-124.

(49) Zhou, G. W.; Kang, Y. S. *Mater. Sci. Eng. C* 2004, 24 (1-2), 71-74.

(50) Gao, B.; Kim, Y. J.; Chakraborty, A. K.; Lee, W. I. *Appl. Catal. B Environ.* 2008, 83 (3-4), 202-207.

(51) Liu, F.; He, H.; Zhang, C. *Chem. Commun.* 2008, No. 17, 2043-2045.

(52) Enhessari, M.; Parviz, A.; Karamali, E.; Ozaee, K. *J. Exp. Nanosci.* 2012, 7 (3), 327-335.

(53) Steiner, H. J.; Middleton, P. H.; Steele, B. C. H. *J. Alloys Compd.* 1993, 190 (2), 279-285.

(54) Avci, C.; Aydin, A.; Tuna, Z.; Yavuz, Z.; Yamauchi, Y.; Suzuki, N.; Dag, Ö. *Chem. Mater.* 2014, 26 (20), 6050-6057.

(55) Absalan, Y.; Bratchikova, I. G.; Lobanov, N. N.; Kovalchukova, O. V. *Journal of Materials Science: Materials in Electronics.* Springer US Dec. 12, 2017, p 18220.

(56) Yuan, P. H.; Fan, C. M.; Ding, G. Y.; Wang, Y. F.; Zhang, X. C. *Int. J. Miner. Metall. Mater.* 2012, 19 (4), 372-376.

(57) Xin, S.; Jing, H.; Dong, C. *Ind. Eng. Chem. Res.* 2008, 47 (14), 4750-4753.

(58) Nakhowong, R. *Mater. Lett.* 2015, 161, 468-470.

(59) Hashemian, S.; Foroghimoqhadam, A. *Chem. Eng. J.* 2014, 235, 299-306.

(60) Song, L. T.; Li, M. C.; Tao, A. L.; Yang, H.; Wu, Y. S. *Mater. Res. Express* 2018, 5 (6).

(61) Huang, Z. D.; Zhang, T. T.; Lu, H.; Yang, J.; Bai, L.; Chen, Y.; Yang, X. S.; Liu, R. Q.; Lin, X. J.; Li, Y.; Li, P.; Liu, X.; Feng, X. M.; Ma, Y. W. *Sci. China Mater.* 2018, 61 (8), 1057-1066.

(62) Wang, P.; Zhao, G.; Wang, Y.; Lu, Y. *Sci. Adv.* 2017, 3 (6), e1603180.

(63) Houck, J. D.; Amar, V. S.; Shende, R. V. *Mesoporous Nanocomposites of Mn and Ti Oxides for Supercapacitors.*

(64) Mohammadi, M. R.; Fray, D. J. *Particuology* 2011, 9 (3), 235-242.

(65) Zarazúa-Morín, M. E.; Torres-Martínez, L. M.; Moctezuma, E.; Juárez-Ramírez, I.; Zermeño, B. B. *Res. Chem. Intermed.* 2016, 42 (2), 1029-1043.

(66) Hou, R. Z.; Ferreira, P.; Vilarinho, P. M. *Microporous Mesoporous Mater.* 2008, 110 (2-3), 392-396.

(67) Selvarajan, S.; Malathy, P.; Suganthi, A.; Rajarajan, M. *J. Ind. Eng. Chem.* 2017, 53, 201-212.

(68) Kumari, V.; Sasidharan, M.; Bhaumik, A. *Dalt. Trans.* 2015, 44 (4), 1924-1932.
(69) Poyraz, A. S.; Kuo, C. H.; Biswas, S.; King'Ondu, C. K.; Suib, S. L. *Nat. Commun.* 2013, 4.
(70) Ji, S. P.; Liu, L. W.; Chen, F.; Ren, H. X.; Yang, Y.; Zhang, Z. B.; Peng, L.; Wang, L. X. European *J. Org. Chem.* 2016, 2016 (32), 5437-5444.
(71) Adam, W.; Krebs, O. *Chemical Reviews.* 2003, pp 4131-4146.
(72) Ghorpade, S.; Jadhav, P. D.; Liu, R. S. *Chem.—A Eur. J.* 2016, 22 (9), 2915-2919.
(73) Arbuzov, Y. A. *Bull. Acad. Sci. USSR Div. Chem. Sci.* 1952, 1 (4), 607-611.
(74) Momiyama, N.; Yamamoto, H. *J. Am. Chem. Soc.* 2004, 126 (17), 5360-5361.
(75) Sakaue, S.; Tsubakino, T.; Nishiyama, Y.; Ishii, Y. *J. Org. Chem.* 1993, 58 (14), 3633-3638.
(76) Møller, E. R.; Jorgensen, K. A. *J. Am. Chem. Soc.* 1993, 115 (25), 11814-11822.
(77) Shiraishi, Y.; Sakamoto, H.; Fujiwara, K.; Ichikawa, S.; Hirai, T. *ACS Catal.* 2014, 4 (8), 2418-2425.
(78) Priewisch, B.; Rück-Braun, K. *J. Org. Chem.* 2005, 70 (6), 2350-2352.
(79) Dong, M.; Babalhavaeji, A.; Samanta, S.; Beharry, A. A.; Woolley, G. A. *Acc. Chem. Res.* 2015, 48 (10), 2662-2670.
(80) Rudrangi, S. R. S.; Kumar Bontha, V.; Reddy Manda, V.; Bethi, S. *Asian J. Res. Chem.* 2011, 4, 335-338.
(81) Inamdar, A. I.; Kalubarme, R. S.; Kim, J.; Jo, Y.; Woo, H.; Cho, S.; Pawar, S. M.; Park, C. J.; Lee, Y. W.; Sohn, J. I.; Cha, S.; Kwak, J.; Kim, H.; Im, H. *J. Mater. Chem. A* 2016, 4 (13), 4691-4699.
(82) Mitchell Albala. Nickel Titanate, the Coolest Yellow https://blog.mitchalbala.com/nickel-titanate-the-coolest-yellow/(accessed Nov. 15, 2018).
(83) Hernandez-Ramírez, A.; Sánchez-Castro, M. E.; Alonso-Lemus, I.; Aruna, K. K.; Karthikeyan, P.; Manoharan, R.; Rodríguez-Varela, F. J. *J. Electrochem. Soc.* 2016, 163 (2), F16-F24.
(84) Lee, K. J.; Chang, Y. C.; Lee, C. J.; Wang, L. W.; Chou, D. W.; Chiang, T. K.; Wang, Y. H. *IEEE Trans. Electron Devices* 2017, 64 (5), 2001-2007.
(85) Hobbs, D. T. *J. South Carolina Acad. Sci.* 2011, 9 (1), 20.
(86) Somiya, S. *Handbook of Advanced Ceramics: Materials, Applications, Processing, and Properties: Second Edition*; Elsevier, 2013.
(87) Lew, S.; Sarofim, A. F.; Flytzani-Stephanopoulos, M. *Sulfidation of Zinc Titanate and Zinc Oxide Solids;* 1992; Vol. 31.
(88) Badapanda, T.; Sahoo, S.; Nayak, P. In *IOP Conference Series: Materials Science and Engineering;* 2017; Vol. 178.
(89) Ahmadipour, M.; Ain, M. F.; Ahmad, Z. A. *Nano-Micro Letters.* 2016, pp 291-311.

What is claimed is:

1. A mesoporous metal titanate material, wherein the material has a homogeneous pore size distribution and a surface area, and the material is in the form of one or more particles,
   wherein the average pore size diameter is in the range of about 2 to about 7 nm and the surface area is in the range of about 200 $m^2/g$ to about 550 $m^2/g$, and
   wherein the one or more particles have an average particle diameter of less than 50 nm.

2. The mesoporous metal titanate material according to claim 1, wherein the metal is a transition metal, a p-block metal, an s-block metal, or a lanthanide.

3. The mesoporous metal titanate material according to claim 2, wherein the metal is a transition metal.

4. The mesoporous metal titanate material according to claim 3, wherein the transition metal is a first row-transition metal.

5. The mesoporous metal titanate material according to claim 2, wherein the metal is a p-block metal.

6. The mesoporous metal titanate material according to claim 2, wherein the metal is an s-block metal.

7. The mesoporous metal titanate material according to claim 2, wherein the metal is a lanthanide.

8. A multifunctional catalyst comprising the mesoporous metal titanate material according to claim 1.

* * * * *